United States Patent
Chang et al.

(10) Patent No.: US 10,432,856 B2
(45) Date of Patent: Oct. 1, 2019

(54) METHOD AND APPARATUS OF VIDEO COMPRESSION FOR PRE-STITCHED PANORAMIC CONTENTS

(71) Applicant: MEDIATEK INC., Hsin-Chu (TW)

(72) Inventors: Tsui-Shan Chang, Tainan (TW);
Yu-Hao Huang, Kaohsiung (TW);
Chih-Kai Chang, Taichung (TW);
Tsu-Ming Liu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 116 days.

(21) Appl. No.: 15/600,954

(22) Filed: May 22, 2017

(65) Prior Publication Data

US 2018/0124312 A1 May 3, 2018

Related U.S. Application Data

(60) Provisional application No. 62/413,471, filed on Oct. 27, 2016.

(51) Int. Cl.
*H04N 19/597* (2014.01)
*H04N 19/176* (2014.01)
(Continued)

(52) U.S. Cl.
CPC ....... *H04N 5/23238* (2013.01); *G06T 3/4038* (2013.01); *H04N 19/105* (2014.11);
(Continued)

(58) Field of Classification Search
CPC .......................... H04N 5/23238; H04N 19/105
See application file for complete search history.

(56) References Cited

U.S. PATENT DOCUMENTS 8,824,817 B2 * 9/2014 Drugeon .............. H04N 19/136
382/238
9,892,488 B1 * 2/2018 Brailovskiy .......... G06T 3/4038
(Continued)

FOREIGN PATENT DOCUMENTS

| CN | 102333221 A | 1/2012 |
| CN | 104463786 A | 3/2015 |

(Continued)

*Primary Examiner* — Irfan Habib
(74) *Attorney, Agent, or Firm* — McClure, Qualey & Rodack, LLP

(57) ABSTRACT

Methods and apparatus of compression for pre-stitched pictures captured by multiple cameras of a panoramic video capture device are disclosed. At the encoder side, stitching information associated with a stitching process to form the pre-stitched pictures is used to encode a current block according to embodiments of the present invention, where the stitching information comprises calibration data, matching results, seam position, blending level, sensor data, or a combination thereof. In one embodiment, the stitching information corresponds to matching results associated with a projection process, and projection-based Inter prediction is used to encode the current block by projecting a reference block in a reference pre-stitched picture to coordinates of the current block. In another embodiment, the stitching information corresponds to seam information associated with seam detection, and seam-based Inter prediction is used to encode the current block by utilizing the seam information.

24 Claims, 18 Drawing Sheets

(51) Int. Cl.
*H04N 19/192* (2014.01)
*H04N 5/232* (2006.01)
*G06T 3/40* (2006.01)
*H04N 19/85* (2014.01)
*H04N 19/105* (2014.01)
*H04N 19/46* (2014.01)
*H04N 19/146* (2014.01)
*H04N 13/128* (2018.01)

(52) U.S. Cl.
CPC ......... *H04N 19/146* (2014.11); *H04N 19/176* (2014.11); *H04N 19/192* (2014.11); *H04N 19/46* (2014.11); *H04N 19/597* (2014.11); *H04N 19/85* (2014.11); *H04N 13/128* (2018.05)

(56) References Cited

U.S. PATENT DOCUMENTS

| | | | |
|---|---|---|---|
| 10,063,792 B1 * | 8/2018 | Brailovskiy | H04N 5/2628 |
| 2007/0014482 A1 * | 1/2007 | Kim | G06T 5/005 382/254 |
| 2009/0022422 A1 * | 1/2009 | Sorek | G06T 3/4038 382/284 |
| 2014/0118460 A1 * | 5/2014 | Bivolarsky | H04N 19/46 348/14.01 |
| 2014/0347439 A1 * | 11/2014 | Jia | H04N 5/23238 348/36 |
| 2016/0088287 A1 * | 3/2016 | Sadi | H04N 13/254 |
| 2016/0295126 A1 * | 10/2016 | Wang | A61B 1/041 |
| 2017/0336705 A1 * | 11/2017 | Zhou | G06T 3/0062 |
| 2017/0339341 A1 * | 11/2017 | Zhou | H04N 5/23238 |
| 2017/0339391 A1 * | 11/2017 | Zhou | H04L 65/604 |
| 2018/0288425 A1 * | 10/2018 | Panusopone | H04N 19/176 |

FOREIGN PATENT DOCUMENTS

| | | |
|---|---|---|
| CN | 105389787 A | 3/2016 |
| TW | M373507 U1 | 2/2010 |
| TW | 201404128 A | 1/2014 |

* cited by examiner

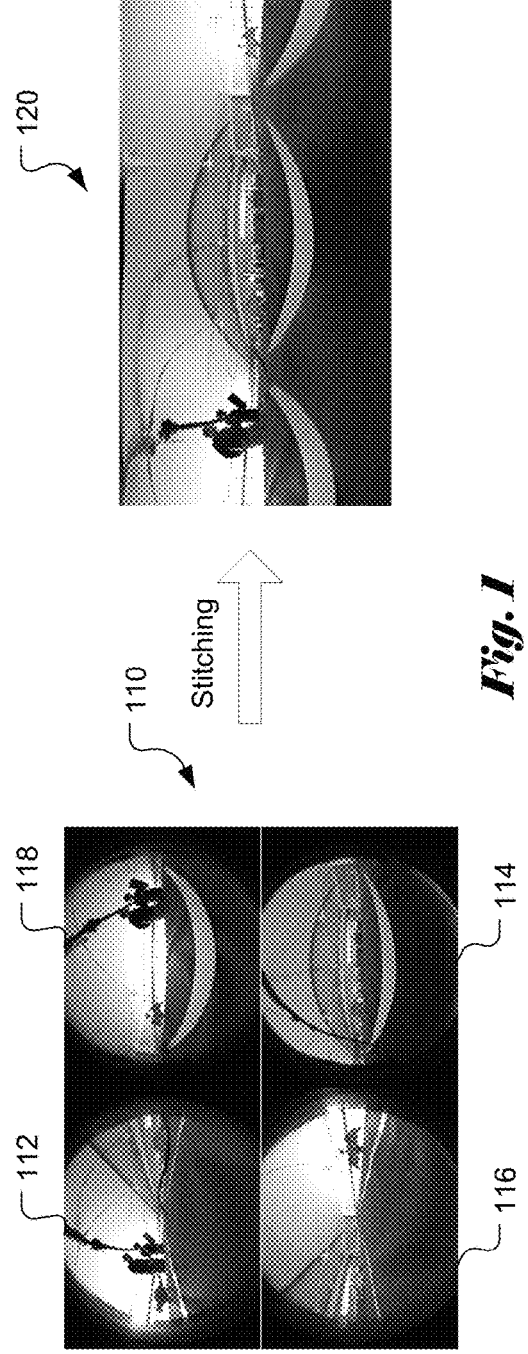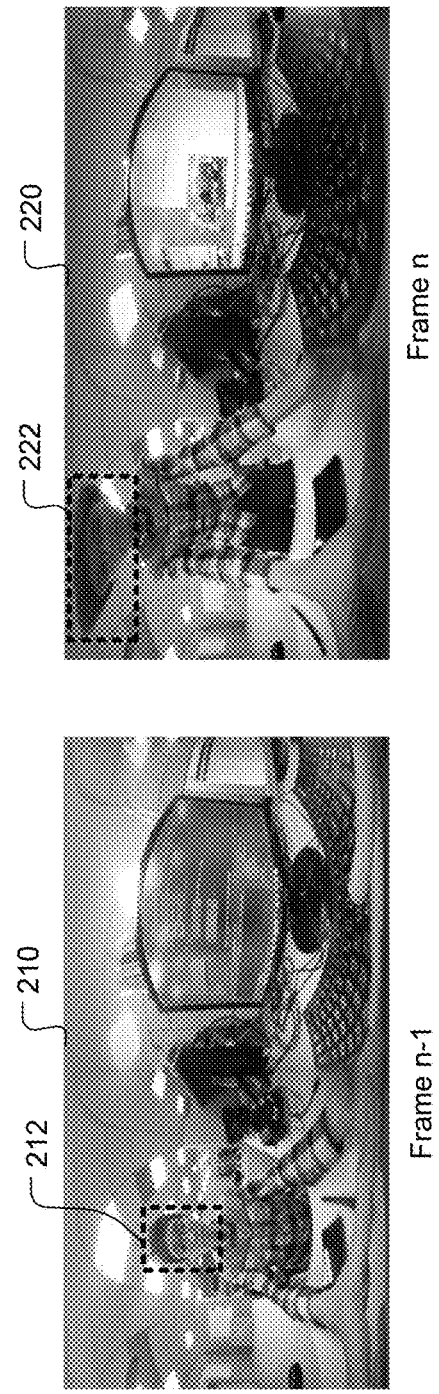
Fig. 1
Fig. 2

$$R = R_z(0°) \cdot R_y(70°) \cdot R_x(0°)$$

METHOD AND APPARATUS OF VIDEO COMPRESSION FOR PRE-STITCHED PANORAMIC CONTENTS

CROSS REFERENCE TO RELATED APPLICATIONS

The present invention claims priority to U.S. Provisional Patent Application, Ser. No. 62/413,471, filed on Oct. 27, 2016. The U.S. Provisional Patent Application is hereby incorporated by reference in its entirety.

FIELD OF THE INVENTION

The present invention relates to video coding. In particular, the present invention relates to techniques of video compression for pre-stitched pictures generated from multiple cameras of a panoramic video capture device.

BACKGROUND AND RELATED ART

The 360-degree video, also known as immersive video is an emerging technology, which can provide "feeling as sensation of present". The sense of immersion is achieved by surrounding a user with wrap-around scene covering a panoramic view, in particular, 360-degree field of view. The "feeling as sensation of present" can be further improved by stereographic rendering. Accordingly, the panoramic video is being widely used in Virtual Reality (VR) applications.

Immersive video involves the capturing a scene using multiple cameras to cover a panoramic view, such as 360-degree field of view. The immersive camera usually uses a set of cameras, arranged to capture 360-degree field of view. The set of cameras may consist of as few as one camera. Nevertheless, typically two or more cameras are used for the immersive camera. All videos must be taken simultaneously and separate fragments (also called separate perspectives) of the scene are recorded. Furthermore, the set of cameras are often arranged to capture views horizontally, while other arrangements of the cameras are possible.

The set of cameras have to be calibrated to avoid possible misalignment. Calibration is a process of correcting lens distortion and describing the transformation between world coordinate and camera coordinate. The calibration process is necessary to allow correct stitching of videos. Individual video recordings have to be stitched in order to create one 360-degree video. Stitching of pictures has been well studied in the field via the context of blending or seam processing.

FIG. 1 illustrates an example of images from panoramic videos corresponding to a given time instance. The panoramic videos are captured using four cameras, where the principle axis of each camera is rotated roughly 90° from that of a neighboring camera. The set of four non-stitched images 110 consists of four images (112, 114, 116 and 118) from four cameras. Each camera covers very wide field of view (i.e., using wide angle lens) so that pictures from neighboring cameras have a substantial overlapped area. The set of pictures corresponding to the panoramic videos at a given instance are then stitched to form a pre-stitched picture 120. A pre-stitched picture 120 is a stitched picture that is stitched prior to enter the video compression system for subsequent compression.

For panoramic video, in particular, the 360-degree video, multiple videos may be captured using multiple cameras. A large amount of bandwidth or storage will be needed for the data necessary to render a full virtual reality environment. With the ever increasing video resolutions, the required bandwidth or storage becomes formidable. Therefore, it is desirable to develop efficient video compression techniques for the 360-degree video, in particular the pre-stitched panoramic video.

BRIEF SUMMARY OF THE INVENTION

Methods and apparatus of compression for pre-stitched pictures captured by multiple cameras of a panoramic video capture device are disclosed. At the encoder side, stitching information associated with a stitching process to form the pre-stitched pictures is used to encode a current block according to embodiments of the present invention, where the stitching information comprises calibration data, matching results, seam position, blending level, sensor data, or a combination thereof. In one embodiment, the stitching information corresponds to matching results associated with a projection process, and projection-based Inter prediction is used to encode the current block by projecting a reference block in a reference pre-stitched picture to coordinates of the current block. In another embodiment, the stitching information corresponds to seam information associated with seam detection, and seam-based Inter prediction is used to encode the current block by utilizing the seam information.

For projection-based Inter prediction at the encoder side, motion search is performed for the current block based on spherical coordinates designated as roll, pitch and yaw. The motion search identifies one or more predictor candidates in the pre-stitched picture. Each predictor candidate as indicated by a spherical motion vector is projected to the coordinates of the current block using a translation matrix, wherein the spherical motion vector consists of roll, pitch and yaw values and the translation matrix is derived based on the roll, pitch and yaw values. Residuals associated with each predictor candidate are derived from the current block and a projected predictor of each predictor candidate. Rate-distortion cost associated with each predictor candidate is calculated, and a best predictor candidate is selected as a current predictor for the current block according to the rate-distortion cost. In one embodiment, the projection-based Inter prediction is applied to the current block only if y-position of the current block is outside a specified range. Otherwise, normal Inter prediction is applied to the current block and motion search for best predictor is performed in the (x, y) domain for the normal Inter prediction. The specified range corresponds to a middle range in vertical direction.

For seam-based Inter prediction at the encoder side, the seam information is parsed from panoramic video source data and if the seam information exists, motion search is performed to identify predictor candidates. Whether a seam crosses any predictor candidate or current block is checked and whether any predictor candidate and the current block are on different sides of a seam is also checked. If the seam crosses any predictor candidate or the current block, brightness, color or both of the predictor candidate are adjusted to match the current block by scaling pixel intensity of the predictor candidate on one side of the seam and if any predictor candidate and current block, brightness, color or both of the predictor candidate are adjusted to match the current block by scaling pixel intensities of all pixels in the predictor candidate. Residuals associated with each predictor candidate are derived from the current block and a scaled predictor of each predictor candidate, rate-distortion cost associated with each predictor candidate is calculated, and a best predictor candidate is selected as a current predictor for the current block according to the rate-distortion cost. In another embodiment, if the seam information does not exist, conventional Inter prediction is applies to encode the current block.

For projection-based Inter prediction at the decoder side, the stitching information corresponds to matching results associated with a projection process, and the current block is decoded by projecting a reference block in a reference pre-stitched picture to coordinates of the current block. The projection-based Inter prediction performs motion compensation for the current block based on spherical coordinates designated as roll, pitch and yaw. A spherical motion vector is decoded from the compressed data and a predictor indicated by the spherical motion vector is projected to the coordinates of the current block to form a projected predictor using a translation matrix. The spherical motion vector consists of roll, pitch and yaw values and the translation matrix is derived based on the roll, pitch and yaw values. Residuals of the current block are derived from the compressed data, and the current block is reconstructed from the residuals of the current block and the projected predictor. In another embodiment, the projection-based Inter prediction is applied to decode the current block if y-position of the current block is within a specified range. Otherwise, normal Inter prediction is applied to decode the current block and a predictor indicated by a motion vector in the (x, y) domain is combined with residuals derived from the compressed data to reconstruct the current block. The specified range may correspond to a middle range in the vertical direction.

For seam-based Inter prediction at the decoder side, the stitching information corresponds to seam information associated with seam detection, and seam-based Inter prediction is used to decode the current block by utilizing the seam information. In one embodiment, the seam information is parsed from the compressed data. Whether a seam crosses a predictor for the current block or the current block is checked, and whether the predictor and the current block are on different sides of a seam is also checked. If the seam crosses the current predictor for the current block or the current block, then brightness, color or both of the current predictor are adjusted to match the current block by scaling pixel intensities of the predictor on one side of the seam to form a scaled predictor. If the current predictor and the current block are on different sides of a seam, then brightness, color or both of the current predictor are adjusted to match the current block by scaling pixel intensities of all pixels in the current predictor to form the scaled predictor. The scaled predictor is then combined with residuals decoded from the compressed data to reconstruct the current block. If the seam does not cross the current predictor for the current block or the current block, or both the current predictor and the current block are on the same side of the seam, the current predictor without scaling is combined with residuals decoded from the compressed data to reconstruct the current block. In another embodiment, if the seam information does not exist, conventional Inter prediction is applies to decode the current block.

BRIEF DESCRIPTION OF THE DRAWINGS

FIG. 1 illustrates an example of images from panoramic videos corresponding to a given time instance, where the panoramic videos are captured using four cameras and the principle axis of each camera is rotated roughly 90° from that of a neighboring camera.

FIG. 2 illustrates an example of distortion for a same object in two spherical images, where the convention Inter prediction will fail to predict the corresponding areas due to projection nature between the two pre-stitched panoramic images.

DETAILED DESCRIPTION OF THE INVENTION

Figure 3A:
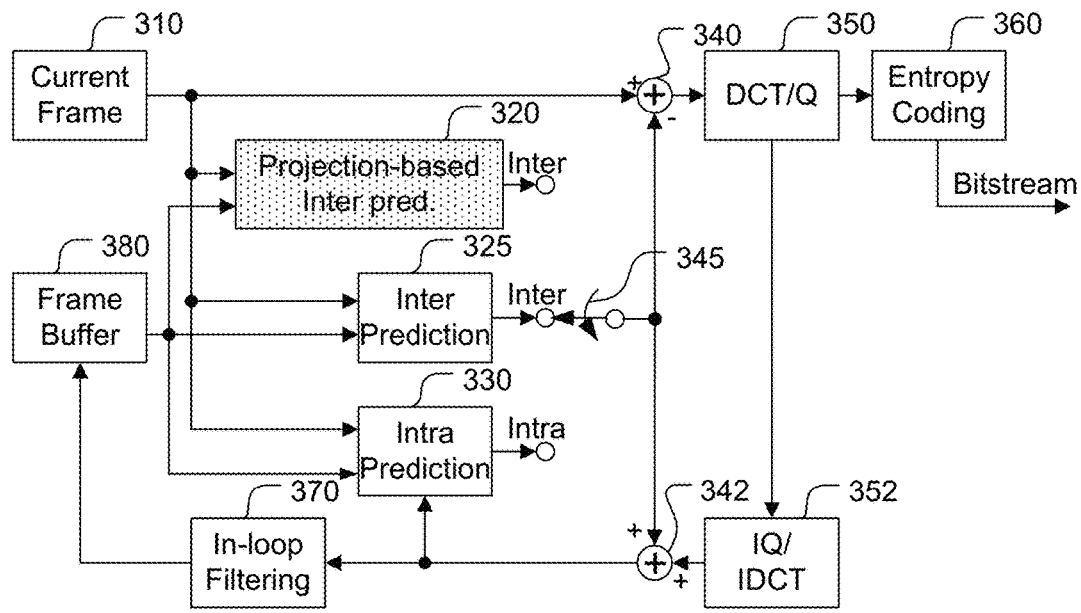
FIG. 3A illustrates an exemplary block diagram of an encoder system incorporating projection-based Inter prediction according to an embodiment of the present invention, where the system includes three prediction modes: projection-based Inter prediction, normal Inter prediction and Intra prediction.

The following description is of the best-contemplated mode of carrying out the invention. This description is made for the purpose of illustrating the general principles of the invention and should not be taken in a limiting sense. The scope of the invention is best determined by reference to the appended claims.

As mentioned before, 360-degree videos usually are captured using multiple cameras associated with separate perspectives. Individual video recordings have to be stitched in order to create a 360-degree video. The stitching process is rather computationally intensive. Therefore, the stitching process is often performed in a non-real time fashion, where the individual videos have to be transmitted or stored for a later stitching process. Alternatively, the stitching process can be performed on a high-performance device instead of a local device that captures the 360-degree video. For example, the stitching task can be performed by a cloud server or other devices for videos captured by a mobile panoramic capture device, such as an immersive camera. Depending on the number of cameras used for capturing the 360-degree panoramic videos, the number of videos to be transmitted or stored may be very large and the videos will require very high bandwidth or very large storage space.

Projection-Based Inter Prediction

As mention above, the set of pictures corresponding to the panoramic videos at a given instance are then stitched to form a pre-stitched picture. The stitching process may involve calibration, projection, seam detection, blending, etc. In the present invention, techniques to efficiently compress pre-stitched contents are disclosed. In the pre-stitched frame, a same object may look very differently in two panoramic frames. If convention Inter or Intra prediction is applied, the coding efficiency will be substantially reduced due to distortion in spherical images. FIG. 2 illustrates an example of distortion for a same object in two spherical images (210 and 220). As shown in FIG. 2, the subject head 212 in spherical image 210 looks substantially distorted from the subject head 222 in spherical image 220. If the convention Inter prediction is applied to the corresponding areas, the motion estimation based on the translational movement model according to the conventional Inter prediction could hardly find any good match between these two corresponding areas. Accordingly, projection-based Inter prediction is disclosed for compression of pre-stitched panoramic contents.

FIG. 3A illustrates an exemplary block diagram of an encoder system incorporating projection-based Inter prediction according to the present invention. The system includes three prediction modes: projection-based Inter prediction 320, normal Inter prediction 325 (or Inter prediction for abbreviation) and Intra prediction 330. The projection-based Inter prediction 320 is a new prediction mode according to the present invention. The details of the projection-based Inter prediction will be discussed later. The Inter Prediction 325 corresponds to the conventional Inter prediction mode that utilizes motion estimation (ME) and motion compensation (MC) to generate temporal prediction for a current frame 310 based on previous reconstructed picture or pictures. The previous reconstructed pictures, also referred as reference pictures, are stored in the Frame Buffer 380. As is known in the field, the ME for the conventional Inter prediction uses translational motion model, where the motion can be specified by an associated motion vector. The Intra prediction 330 generates a predictor for a current block using reconstructed pixels in the same slice or picture as the current block. A switch 345 is used to select among the projection-based Inter prediction 320, Inter prediction 325 and the Intra prediction 330. The selected prediction is subtracted from the corresponding signal of the current frame to generate prediction residuals using an Adder 340. The projection-based prediction residuals are processed using DCT (Discrete Cosine Transform) and Quantization (DCT/Q) 350 followed by Entropy Coding 360 to generate video bitstream. Since reconstructed pictures are also required in the encoder side to form reference pictures. Accordingly, Inverse Quantization and Inverse DCT (IQ/IDCT) 352 are also used to generate reconstructed prediction residuals. The reconstructed residuals are then added with the prediction selected by the switch 345 to form reconstructed video data using another adder 342. In-loop Filtering 370 such as deblocking filter and Sample O (SAO) are often used to reduce coding artifacts due to compression before the reconstructed video is stored in the Frame Buffer 380.

Figure 3B:
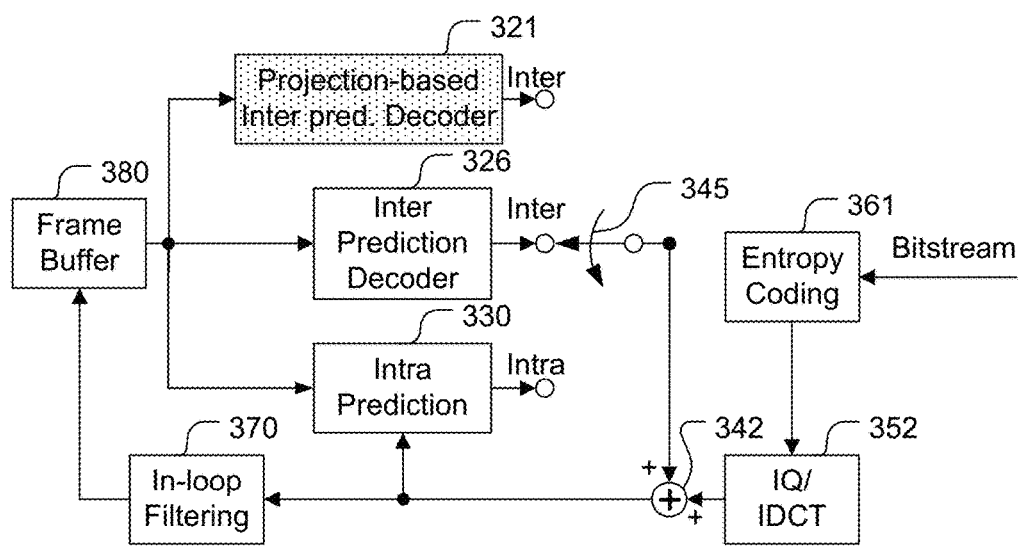
FIG. 3B illustrates an example of decoder system block diagram corresponding to the encoder in FIG. 3A.

FIG. 3B illustrates an example of decoder system block diagram corresponding to the encoder in FIG. 3A. In FIG. 3A, the encoder side also includes a decoder loop to reconstruct the reference video at the encoder side. Most decoder components are used in the encoder side already except for the entropy decoder 361. Furthermore, only motion compensation is required for Inter prediction decoder 326 since the motion vectors can be derived from the video bitstream and there is no need for searching for the best motion vectors. Similarly, a reference block for the projection-based Inter prediction decoder 321 can be identified based on the motion model parameters transmitted in the bitstream without the need for searching for the best motion model parameters.

Figure 4A:
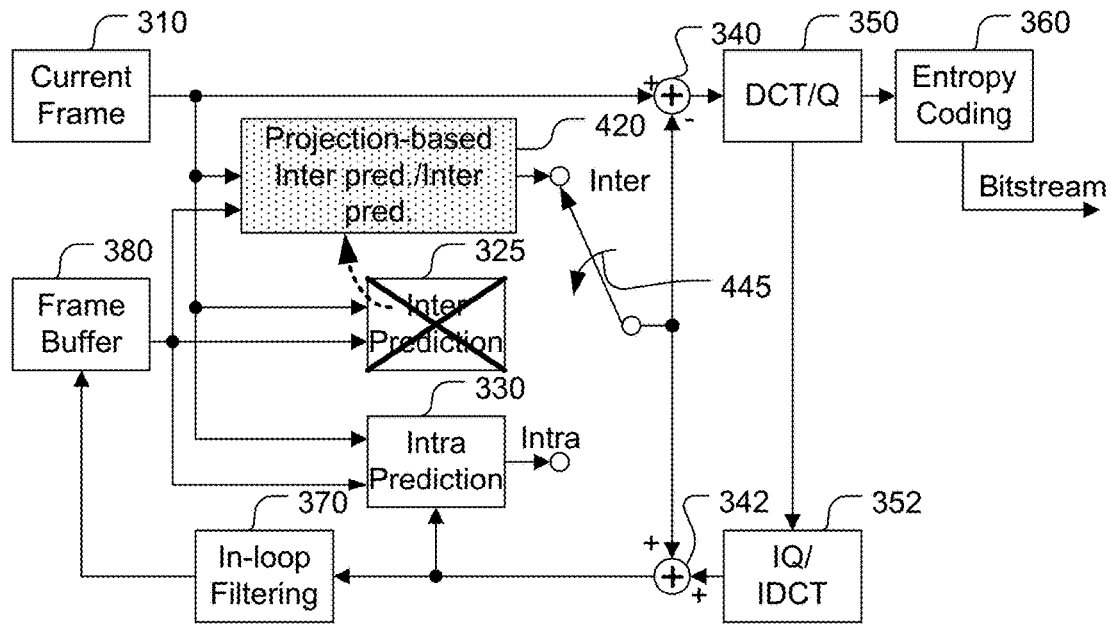
FIG. 4A illustrates another exemplary block diagram of an encoder system incorporating projection-based Inter prediction according to an embodiment of the present invention, where the conventional Inter prediction is combined with the projection-based Inter prediction to form a joint projection-based Inter prediction and conventional Inter prediction.

FIG. 4A illustrates another exemplary block diagram of an encoder system incorporating projection-based Inter prediction according to the present invention. The system is similar to that in FIG. 3A. However, the conventional Inter prediction is combined with the projection-based Inter prediction to form a joint projection-based Inter prediction and conventional Inter prediction 420. In this case, switch 445 selects between the joint projection-based Inter prediction/conventional Inter prediction 420 and the Intra prediction 330.

Figure 4B:
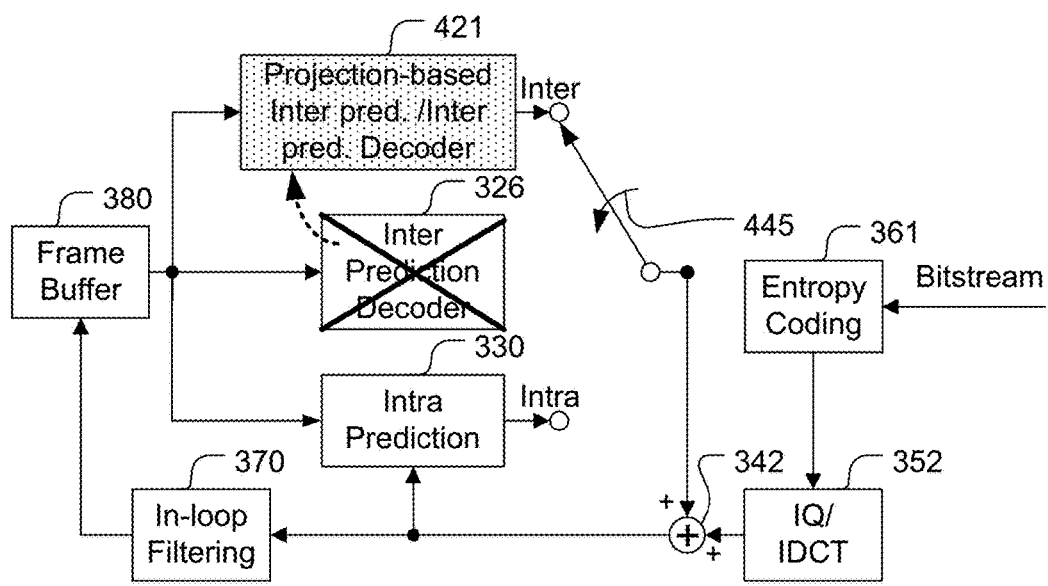
FIG. 4B illustrates an example of decoder system block diagram corresponding to the encoder in FIG. 4A.

FIG. 4B illustrates an example of decoder system block diagram corresponding to the encoder in FIG. 4A. The decoder system is similar to that in FIG. 3B. However, the conventional Inter prediction decoder 326 is combined with the projection-based Inter prediction decoder 321 to become a joint projection-based Inter prediction/conventional Inter prediction decoder 421. In this case, switch 445 selects between the joint projection-based Inter prediction/conventional Inter prediction decoder 421 and the Intra prediction 330.

Figure 5:
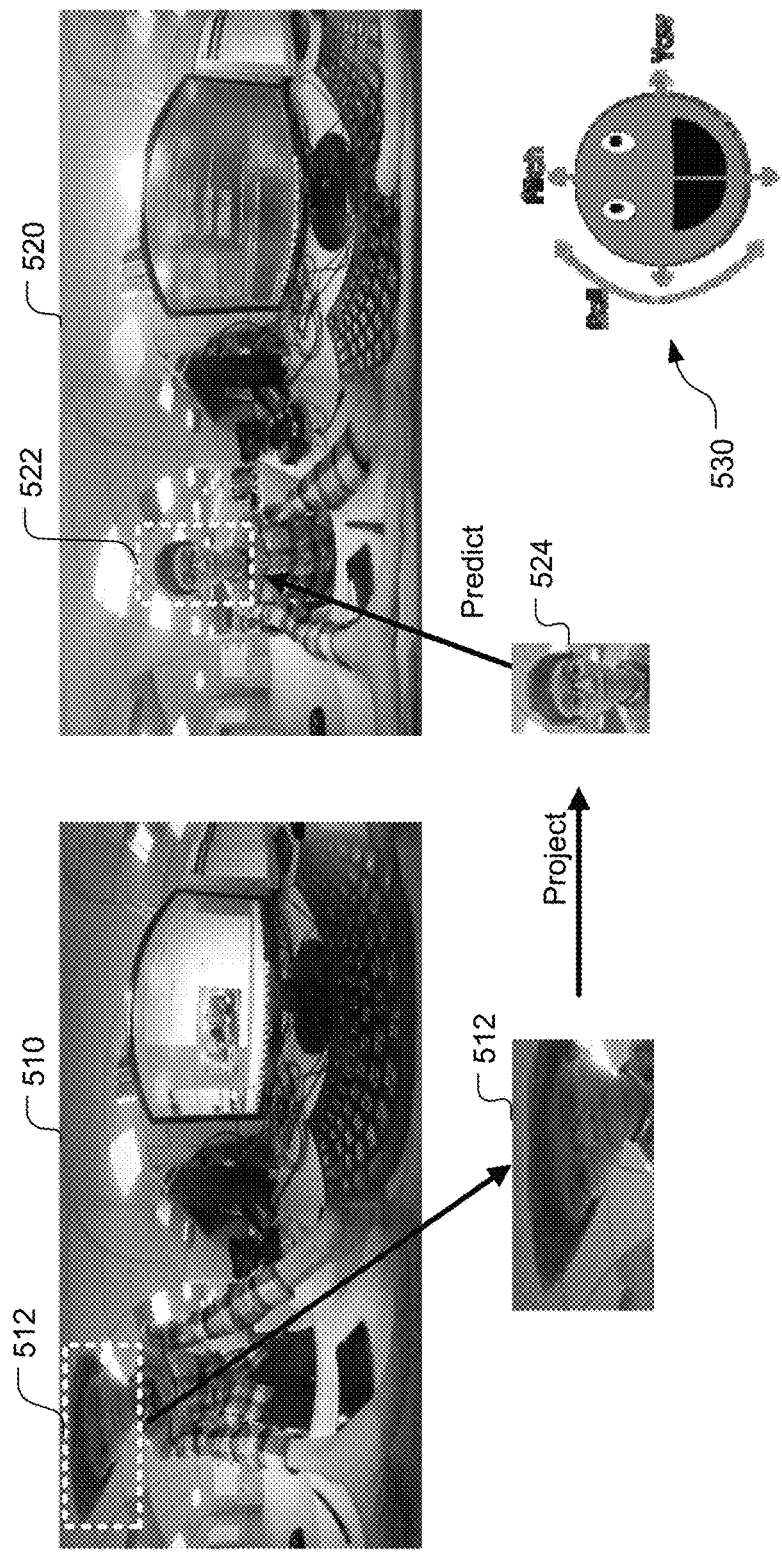
FIG. 5 illustrates an example of two panoramic pictures, where a block in the current picture looks very different from a corresponding block representing the same object in the previous picture.

As mentioned before, the same object in different panoramic pictures may look substantially distorted due to different camera perspectives. For example, two panoramic pictures (510 and 520) are shown in FIG. 5, where picture 510 represents a previously coded pre-stitched panoramic picture and picture 520 represents the present pre-stitched panoramic picture to be coded. Area 512 and area 522 correspond to a same object in picture 510 and picture 520 respectively. However, the appearance of these two areas looks quite different. The conventional motion estimation using a translational motion model would fail to predict the correspondence between these two areas (i.e., predicting area 22 using area 512 as a predictor). According to the present invention, projection-based Inter prediction is disclosed that projects a predictor in the reference picture to the coordinates of current area based on a translation matrix. In particular, the motion search is based on the spherical coordinate—(roll, pitch, yaw) rather than (x, y) domain 530. In other words, the area or block 512 is projected to area or block 524 using a translation matrix R, which corresponds to the product of roll matrix, pitch matrix and yaw matrix, i.e., $R=R_z \cdot R_y \cdot R_x$, $$R_x(\theta) = \begin{bmatrix} 1 & 0 & 0 \\ 0 & \cos\theta & -\sin\theta \\ 0 & \sin\theta & \cos\theta \end{bmatrix}, \quad (1)$$

$$R_y(\theta) = \begin{bmatrix} \cos\theta & 0 & \sin\theta \\ 0 & 1 & 0 \\ -\sin\theta & 0 & \cos\theta \end{bmatrix}, \quad (2)$$

$$R_z(\theta) = \begin{bmatrix} \cos\theta & -\sin\theta & 0 \\ \sin\theta & \cos\theta & 0 \\ 0 & 0 & 1 \end{bmatrix}. \quad (3)$$

Figure 6A:
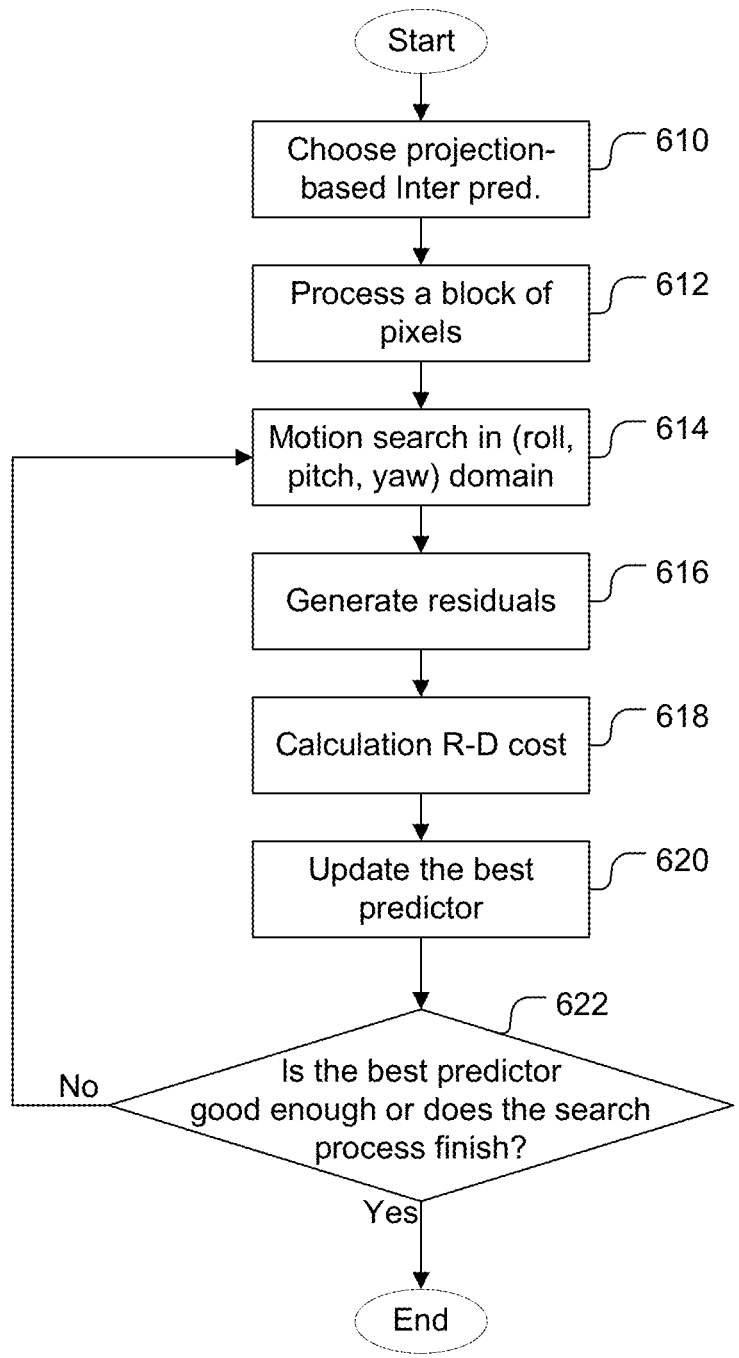
FIG. 6A illustrates an exemplary flowchart of the projection-based Inter prediction in the encoder side, where the projection-based Inter prediction mode is a separated from the conventional Inter prediction mode.

The derivation of the roll matrix, pitch matrix and yaw matrices is known in the field and the details are omitted here. For a current area or block to be coded in the present picture, the projected predictors can be searched in the reference picture based on the spherical coordinate. FIG. 6A illustrates an exemplary flowchart of the projection-based Inter prediction in the encoder side, where the projection-based Inter prediction mode is selected in step 610. A current block of pixels is selected for processing in step 612. Motion search in the (roll, pitch, yaw) domain is performed in step 614, where a predictor candidates is identified. Furthermore, each predictor candidate in the reference panoramic picture is projected onto the current block in the (roll, pitch, yaw) coordinates. After each predictor candidate is projected onto the current block, the corresponding residuals can be generates between the current block and the projected predictor candidate block as shown in step 616. The cost associated with coding the residuals can be determined, where the cost is evaluated in terms of rate and distortion associated with the corresponding predictor candidate. As is known in the field, the rate may include the coded bits for encoding the corresponding residuals and other related information. The distortion is associated with encoding the residuals using a lossy coding process, such as quantization. Accordingly, the R-D (Rate-Distortion) cost for each predictor candidate is calculated in step 618. The R-D cost of the current predictor is compared to a previous best predictor candidate. If the current predictor candidate results in a lower R-D cost, the best predictor candidate is updated with the current predictor candidate as in step 620. In step 622, a search termination criterion is checked. If the criterion is satisfied (i.e., the "Yes" path from step 622), the motion search process is terminated. Otherwise (i.e., the "No" path from step 622), the motion search in step 614 continues. The search termination criterion may correspond to that the best predictor candidate is good enough or the search process is complete. For example, if the distortion is below a threshold, the best predictor may be considered to be good enough. Alternatively, if all possible predictor candidates within a specified window have been searched, the search process may be considered to be complete.

While only the flowchart of the projection-based Inter prediction mode is shown in FIG. 6A for the encoder, the encoder may include other prediction modes such as the conventional Inter prediction and Intra prediction. If the encoder selects another mode, a respective encoding process for other coding modes will be performed. In FIG. 6A, it is assumed that the projection-based Inter prediction mode is implemented as an encoding mode module separated from the encoding mode module for the conventional Inter prediction mode. The flowchart in FIG. 6A is intended for illustrating one encoder example to implement an embodiment of the present invention. The steps can be rearranged or regrouped to implement the projection-based Inter prediction without departing from the spirit of the present invention. Furthermore, the flowchart is intended to illustrate key processing steps related to the present invention and may not include all the detailed steps performed in an encoder. For example, as is known in the field, information related to motion vectors has to be signaled in the bitstream so that motion vectors can be recovered at the decoder side.

Figure 6B:
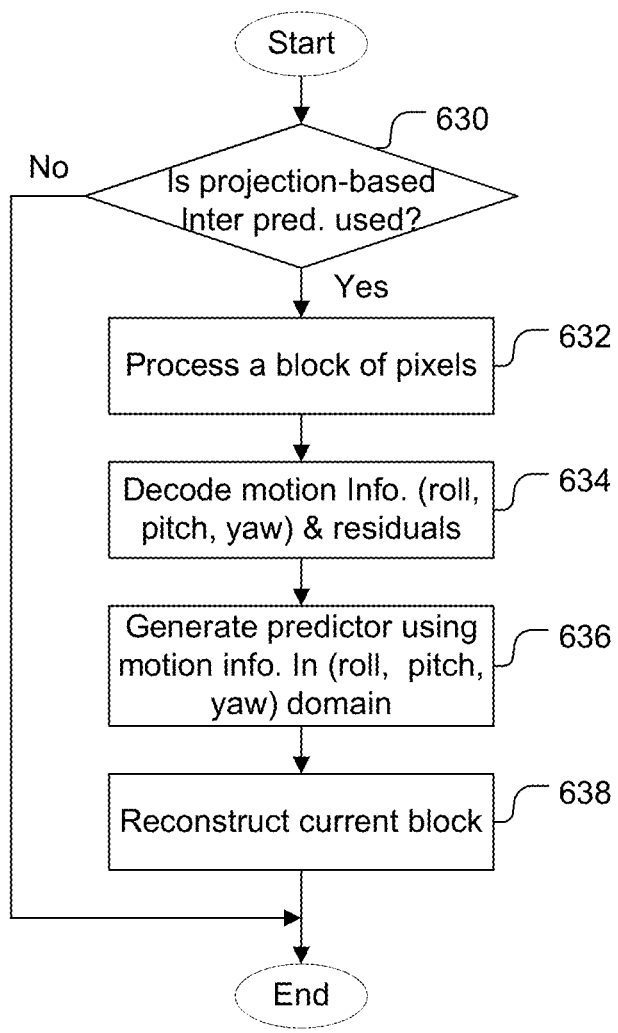
FIG. 6B illustrates an exemplary flowchart of the projection-based Inter prediction in the decoder side.

FIG. 6B illustrates an exemplary flowchart of the projection-based Inter prediction in the decoder side. The decoder determines whether the current block being processed is coded in the projection-based Inter prediction mode in step 630. If the current block is coded using the projection-based Inter prediction (i.e., the "Yes" path from step 630), decoding steps 632 through 638 are performed. Otherwise (i.e., the "No" path from step 630), decoding steps 632 through 638 are skipped and in this case, it implies that the encoder uses a non-projection-based mode. The decoder will have to use a respective mode (e.g. conventional Inter prediction or Intra prediction mode). The current block of pixels processing in step 632. As is known in the field of video coding, the coded bits for the current block are parsed. The motion information in (roll, pitch, yaw) domain associated with projection model as well as the residuals for the current block are decoded in step 634, where entropy decoding may be used if any syntax or symbol is entropy coded at the encoder side. A predictor is generated from the reference picture according to the motion information in the (roll, pitch, yaw) domain in step 636 by projecting a predictor in the reference panoramic picture onto the current block in the (roll, pitch, yaw) coordinates. The decoded residuals and the projected predictor are combined to reconstruct the current block in step 638.

Similarly, while only the flowchart of the projection-based Inter prediction mode is shown in FIG. 6B for the decoder, the decoder may include other prediction modes such as the conventional Inter prediction and Intra prediction. If the mode decoded from the bitstream indicates other modes, a respective decoding process for another coding mode will be performed. In FIG. 6B, it is assumed that the projection-based Inter prediction mode is implemented as a decoding mode module separated from the decoding mode module for the conventional Inter prediction mode.

Figure 7A:
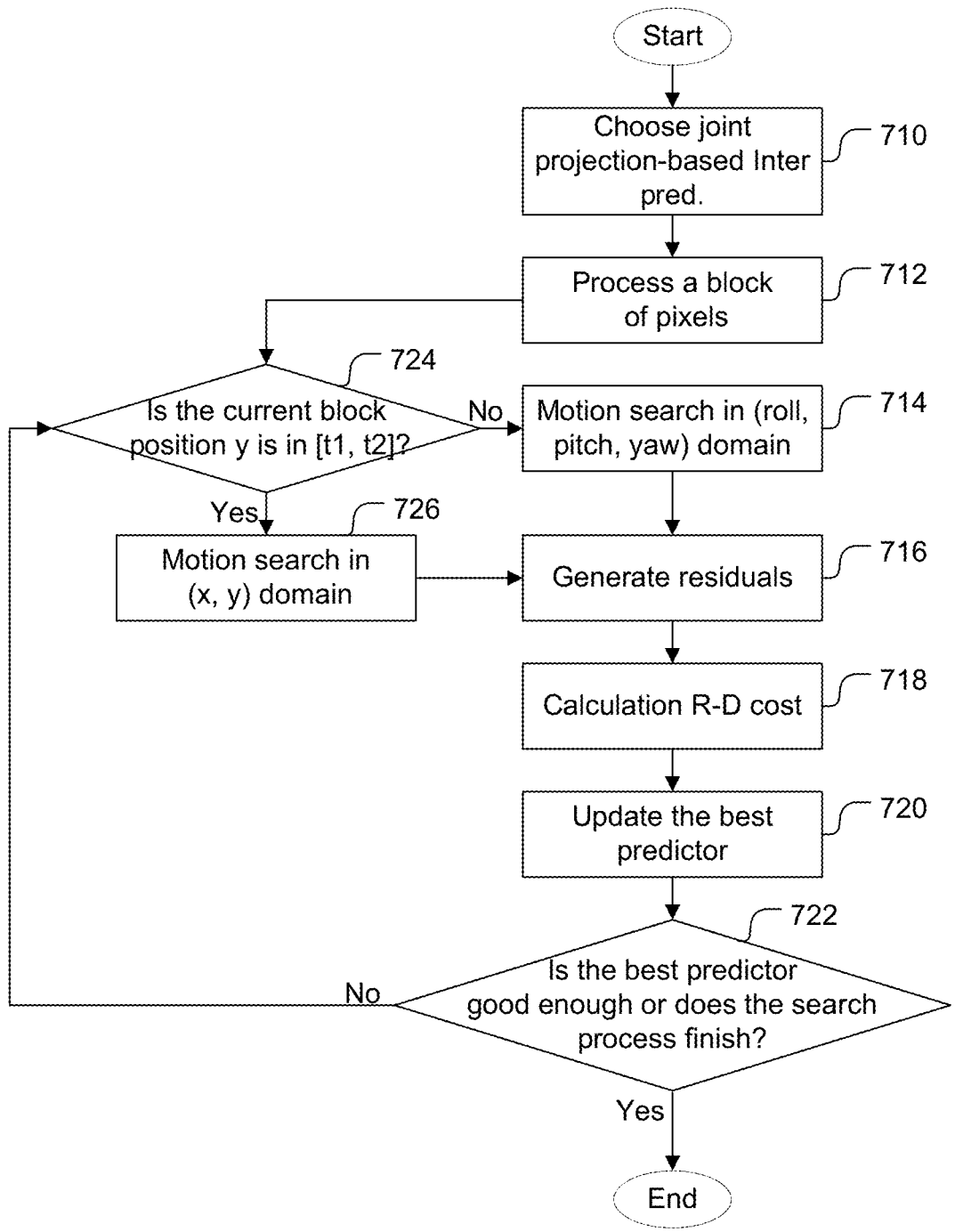
FIG. 7A illustrates an exemplary flowchart of the joint projection-based Inter prediction and conventional Inter prediction in the encoder side according to one embodiment of the present invention.

FIG. 7A illustrates an exemplary flowchart of the joint projection-based Inter prediction in the encoder side, where the joint projection-based Inter prediction with an Inter prediction mode is selected in step 710. A current block of pixels is selected for processing in step 712. In step 724, whether the current block position in the y-direction is within a range specified by [t1, t2] is checked. If the current block position in the y-direction is within [t1, t2] (i.e., the "Yes" path from step 724), step 726 corresponding to the conventional Inter prediction is performed, where the motion search is performed in the (x, y) domain. If the current block position in the y-direction is outside range [t1, t2] (i.e., the "No" path from step 724), step 714 corresponding to the beginning of the projection-based Inter prediction is performed, where the motion search is performed in the (roll, pitch, yaw) domain. Near the vertical center as specified by the vertical range [t1, t2], the distortion is less severe and the projection may not be needed for the predictor candidate. After the predictor candidate is derived by motion search in the (roll, pitch, yaw) domain or the (x, y) domain, the residuals can be generated between the current block and the predictor candidate in step 716. The cost associated with coding the residuals can be determined, where the cost is evaluated in terms of rate required for coding the residuals and associated information and distortion resulted from coding the residuals. Accordingly, the R-D (Rate-Distortion) cost for the predictor candidate is calculated in step 718. The R-D cost of the current predictor candidate is compared to a previous best predictor candidate. If the current predictor candidate results in a lower R-D cost, the best predictor candidate is updated with the current predictor candidate as in step 720. In step 722, a search termination criterion is checked. If the criterion is satisfied, the motion search process is terminated. Otherwise, the encoder process goes back to check whether the current block position in the y-direction is within a range specified by [t1, t2] in step 724 to determine whether to use the projection-based Inter prediction or conventional Inter prediction. The search termination criterion may correspond to that the best predictor is good enough or the search process is complete. For example, if the distortion is below a threshold, the best predictor may be considered to be good enough. Alternatively, if all possible predictors within a specified window have been searched, the search process may be considered to be complete.

Figure 7B:
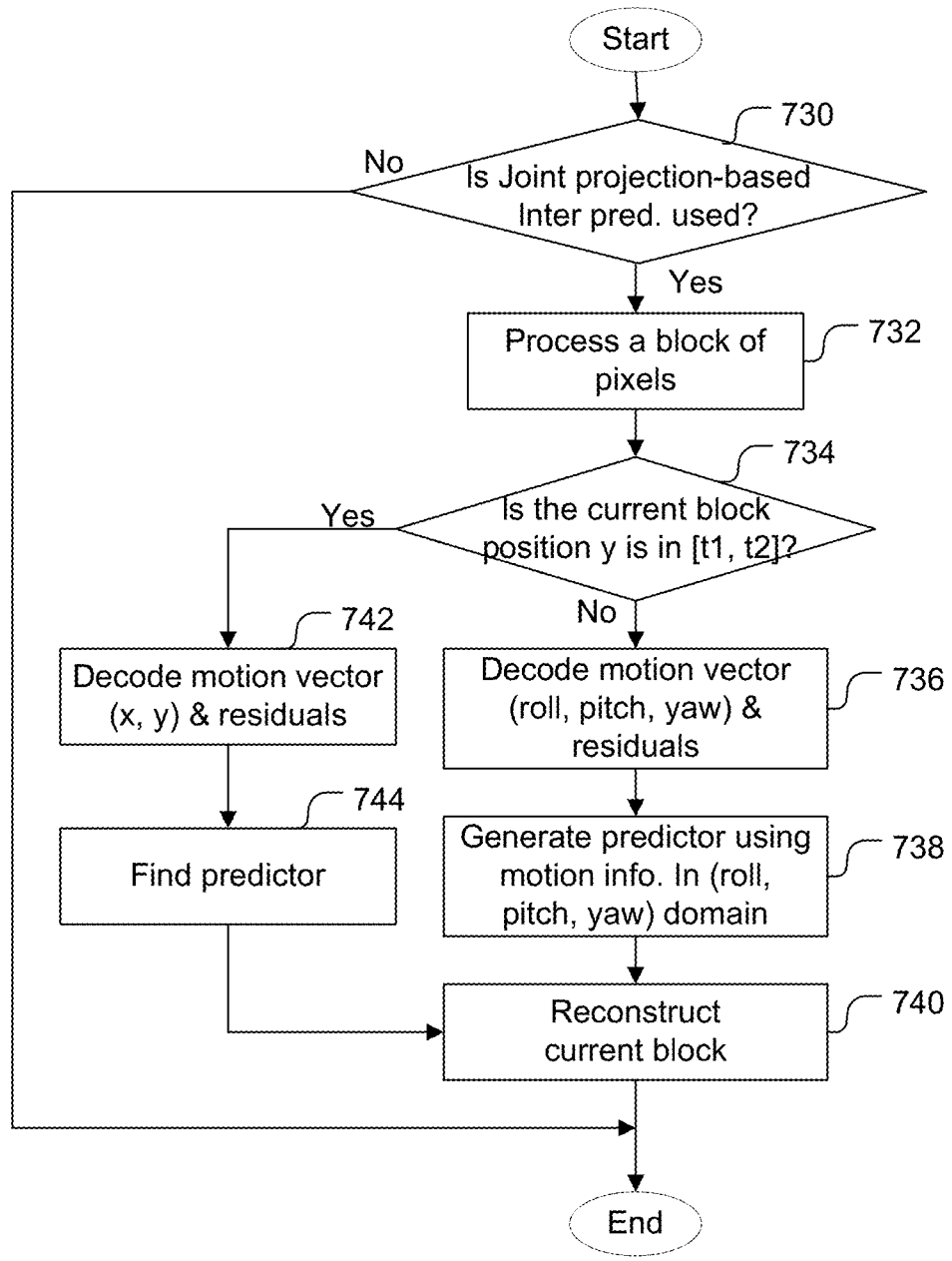
FIG. 7B illustrates an exemplary flowchart of the joint projection-based Inter prediction and conventional Inter prediction in the decoder side.

FIG. 7B illustrates an exemplary flowchart of the joint projection-based Inter prediction in the decoder side, where the joint projection-based Inter prediction also includes Inter prediction. The decoder determines whether the current block being processed is coded in the projection-based Inter prediction mode in step 730. If the current block is coded using the projection-based Inter prediction (i.e., the "Yes" path from step 730), decoding steps 732 is performed. Otherwise (i.e., the "No" path from step 730), the rest steps are skipped. The current block of pixels processing in step 732. In step 734, whether the current block position in the y-direction is within [t1, t2] is checked. If the current block position in the y-direction is within [t1, t2] (i.e., the "Yes" path from step 734), steps 742 and 744 corresponding to the conventional Inter prediction are performed, where the motion compensation is performed in the (x, y) domain. If the current block position in the y-direction is not within [t1, t2] (i.e., the "No" path from step 734), steps 736 and 738 corresponding to the projection-based Inter prediction are performed. The motion information in (roll, pitch, yaw) domain associated with projection model as well as the residuals for the current block are decoded in step 736, where entropy decoding may be used if any syntax or symbol is entropy coded at the encoder side. A predictor is generated from the reference picture according to the motion information in the (roll, pitch, yaw) domain in step 738 by projecting a predictor in the reference panoramic picture onto the current block in the (roll, pitch, yaw) coordinates. In step 740, the decoded residuals and the projected predictor for projection-based Inter prediction (from step 738) or the predictor for conventional Inter prediction (from step 744) are combined to reconstruct the current block.

Figure 8:
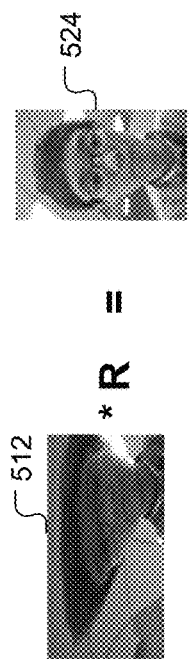
FIG. 8 illustrates an example of projection-based Inter prediction according to the present invention.

FIG. 8 illustrates an example of projection-based Inter prediction according to the present invention. The reference block 512 is projected onto the (roll, pitch, yaw) domain using translation matrix R to form projected predictor 524. The translation matrix can be derived according to the product of roll matrix, pitch matrix and yaw matrices, i.e., $R=R_z \cdot R_y \cdot R_x$ as described in equations (1)-(3). For this particular reference block in the example, the roll, pitch and yaw angles correspond to 0°, 70° and 0° respectively.

Seam-Based Inter Prediction

Figure 9:
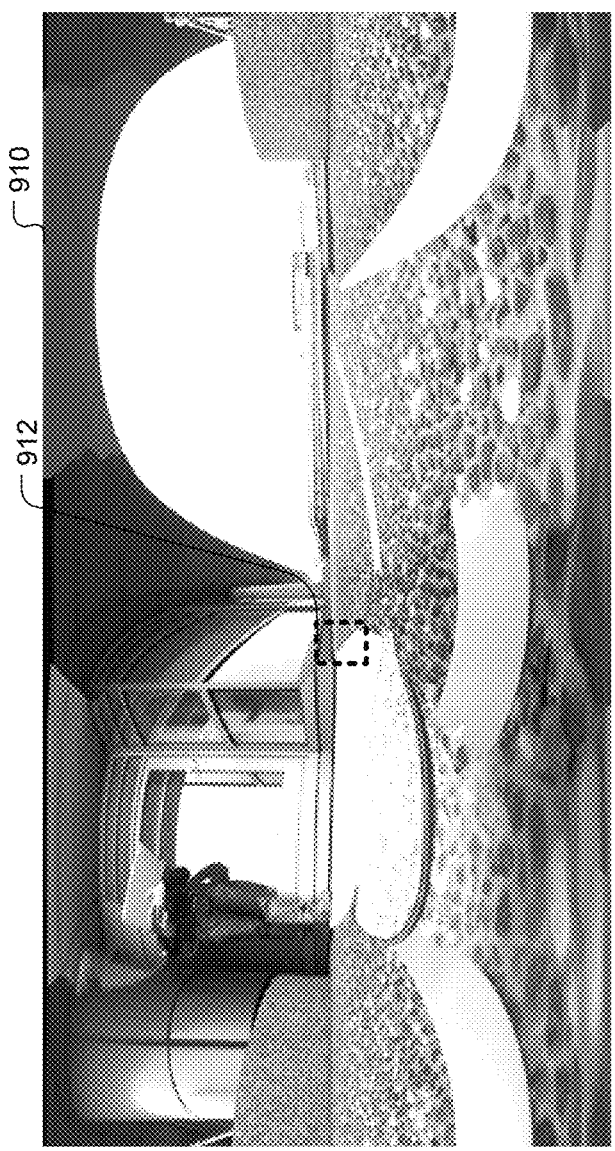
FIG. 9 illustrates an example of seam issue in a pre-stitched picture, where a seam appears in the pre-stitched picture.

Since the illumination in two views cannot be guaranteed to be the same, stitching two images may cause a visible seam. Also, seam positions in different frames may differ. Furthermore, the seams may be caused due to the background changing between two images for the same continuous foreground. The edge discontinuity or brightness/color difference associated with the seams may lower the compression efficiency since the prediction may not work well around the seams. FIG. 9 illustrates an example of seam issue in a pre-stitched picture, where a seam 912 appears in the pre-stitched picture 910. The seam location may be different in another pre-stitched picture and the brightness/color around the seam in another pre-stitched picture may be different from the corresponding neighboring areas of the seam. Accordingly, another method of the present invention discloses seam-based Inter prediction to address this issue so as to improve the compression efficient for pre-stitched pictures.

Figure 10A:
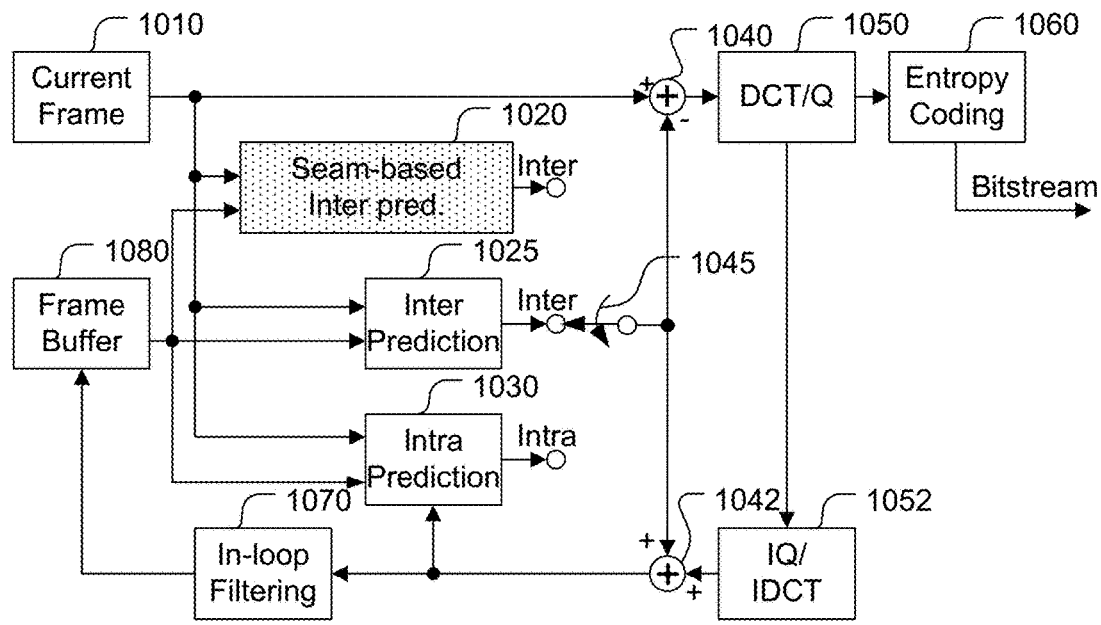
FIG. 10A illustrates an exemplary block diagram of an encoder system incorporating seam-based Inter prediction according to an embodiment of the present invention

FIG. 10A illustrates an exemplary block diagram of an encoder system incorporating seam-based Inter prediction according to an embodiment of the present invention. The system includes three prediction modes: seam-based Inter prediction 1020, normal Inter prediction 1025 (or Inter prediction) and Intra prediction 1030. The seam-based Inter prediction 1020 is a new prediction mode according to the present invention. The details of the seam-based Inter prediction will be discussed later. The Inter Prediction 1025 corresponds to the conventional Inter prediction mode that utilizes motion estimation (ME) and motion compensation (MC) to generate temporal prediction for a current frame 1010 based on previous reconstructed picture or pictures. The previous reconstructed pictures, also referred as reference pictures, are stored in the Frame Buffer 1080. As is known in the field, the ME for the conventional Inter prediction uses translational motion model, where the motion can be specified by an associated motion vector. The Intra prediction 1030 generates a predictor for a current block using reconstructed pixels in the same slice or picture as a current block. A switch 1045 is used to select among the seam-based Inter prediction 1020, Inter prediction 1025 and the Intra Prediction 1030. The selected prediction is subtracted from the corresponding signal of the current frame to generate prediction residuals using an Adder 1040. The seam-based prediction residuals are processed using DCT (Discrete Cosine Transform) and Quantization (DCT/Q) 1050 followed by Entropy Coding 1060 to generate video bitstream. Since reconstructed pictures are also required in the encoder side to form reference pictures. Accordingly, Inverse Quantization and Inverse DCT (IQ/IDCT) 1052 are also used to generate reconstructed prediction residuals. The reconstructed residuals are then added with the prediction selected by the switch 1045 to form reconstructed video data associated with the current frame using adder 1042. In-loop Filtering 1070 such as deblocking filter and Sample Adaptive Offset (SAO) are often used to reduce coding artifacts due to compression before the reconstructed video is stored in the Frame Buffer 1080.

Figure 10B:
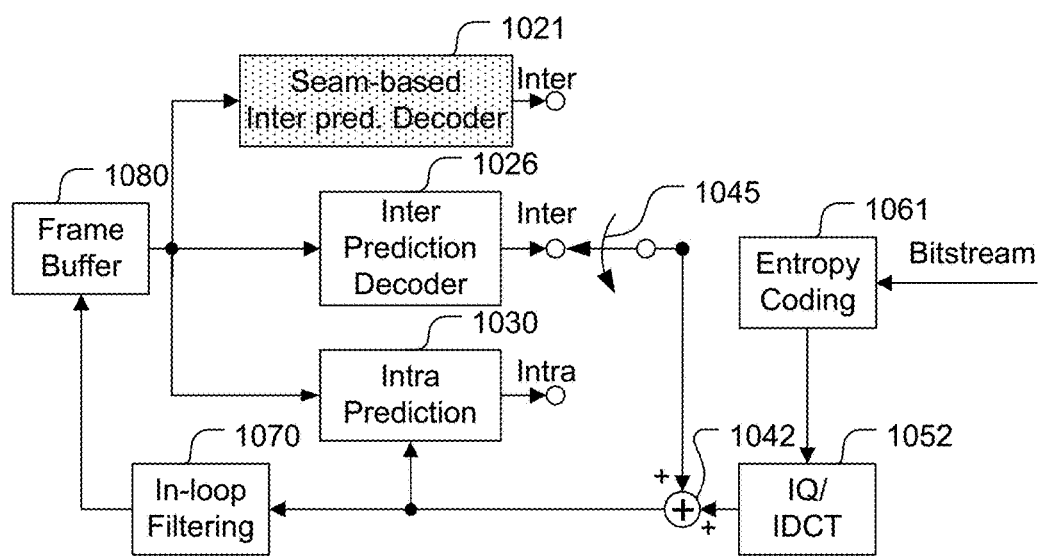
FIG. 10B illustrates an example of decoder system block diagram corresponding to the encoder in FIG. 10A.

FIG. 10B illustrates an example of decoder system block diagram corresponding to the encoder in FIG. 10A. In FIG. 10A, the encoder side also includes a decoder loop to reconstruct the reference video at the encoder side. Most decoder components are used in the encoder side already except for the entropy decoder 1061. Furthermore, only motion compensation is required for Inter prediction decoder 1026 since the motion vectors can be derived from the video bitstream and there is no need for searching for the best motion vectors. Similarly, a reference block for the seam-based Inter prediction decoder 1021 can be identified based on the motion model parameters transmitted in the bitstream without the need for searching for the best motion model parameters.

Figure 11A:
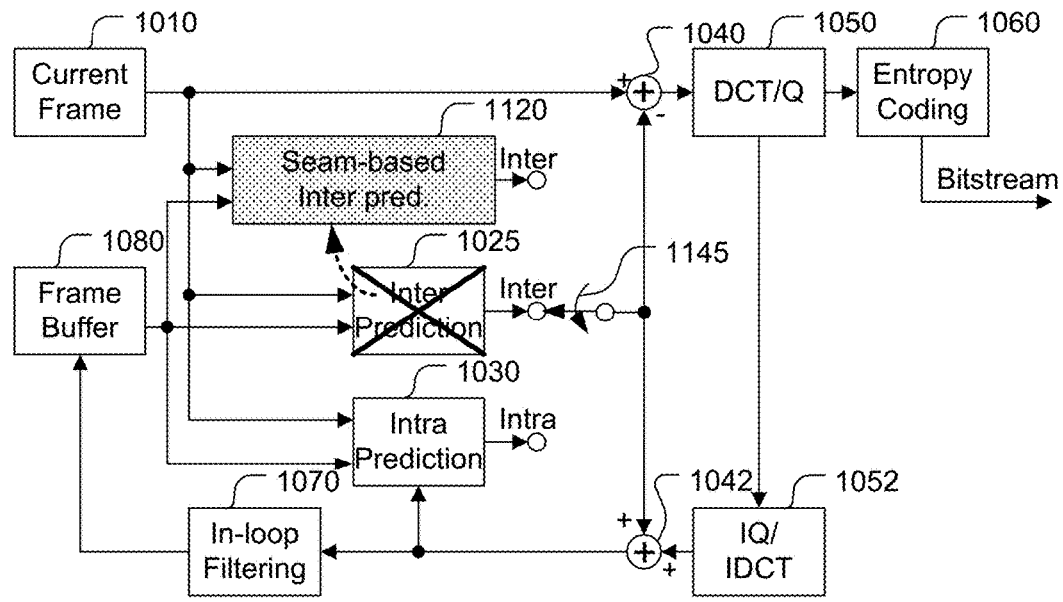
FIG. 11A illustrates another exemplary block diagram of an encoder system incorporating seam-based Inter prediction according to the present invention.

FIG. 11A illustrates another exemplary block diagram of an encoder system incorporating seam-based Inter prediction according to the present invention. The system is similar to that in FIG. 10A. However, the conventional Inter prediction is combined with the seam-based Inter prediction to become a joint seam-based Inter prediction/conventional Inter prediction 1120. In this case, switch 1145 selects between the joint seam-based Inter prediction/conventional Inter prediction 1120 and the Intra prediction 1030.

Figure 11B:
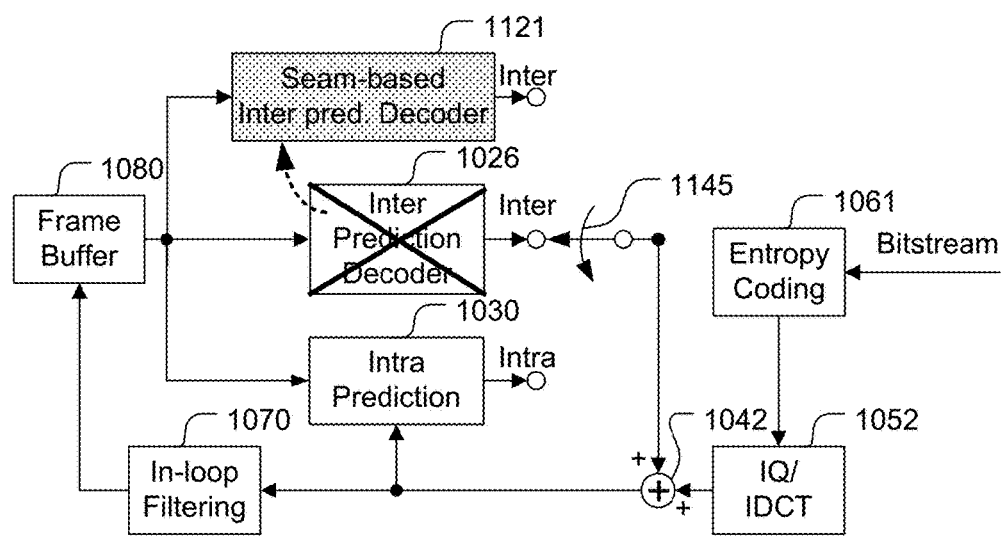
FIG. 11B illustrates an example of decoder system block diagram corresponding to the encoder in FIG. 11A.

FIG. 11B illustrates an example of decoder system block diagram corresponding to the encoder in FIG. 11A. The decoder system is similar to that in FIG. 10B. However, the conventional Inter prediction decoder 1026 is combined with the seam-based Inter prediction decoder 1021 to become a joint seam-based Inter prediction/conventional Inter prediction decoder 1121. In this case, switch 1145 selects between the joint seam-based Inter prediction/conventional Inter prediction decoder 1121 and the Intra prediction 1030.

Figure 12:
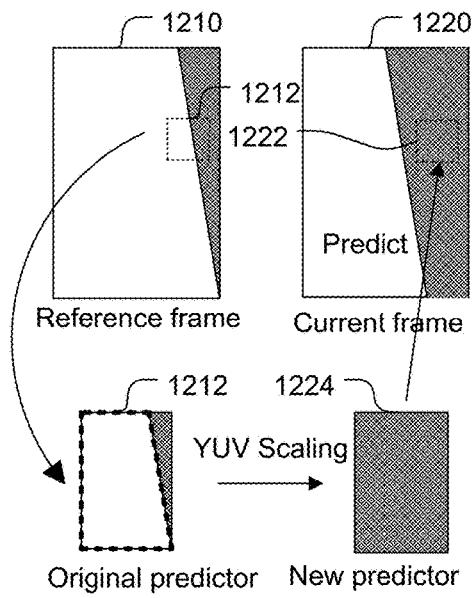
FIG. 12 illustrates an example of seam-based Inter prediction, where the brightness or color of the reference block on one side of the seam is adjusted in the YUV color space.

The details of the seam-based Inter prediction are described as follows. The seam-based Inter prediction can be applied to color pre-stitched pictures in the YUV color space. When the current block does not cross the seam, but the reference block does, the brightness or color of the reference area on one side of the seam can be adjusted to reduce the residuals. In this example, the seam positions are known. FIG. 12 illustrates an example of seam-based Inter prediction, where the brightness or color of the reference block on one side of the seam is adjusted in the YUV color space. In FIG. 12, reference frame 1210 is used to derive seam-based Inter predictor for current frame 1220. For example, current block 1222 is predicted by a corresponding block 1212. However, a seam exists in the reference block corresponding to the current block, which is relatively continuous brightness or color. According to an embodiment of the present invention, the brightness or color on one side of the seam of the reference block is scaled so as to provide a better predictor to improve the accuracy of the prediction. Accordingly, the YUV pixels of the reference block on one side of the seam are scaled to provide a scaled predictor 1224 for the current block. While YUV color space is used as an example, other color space may also be used.

Figure 13:
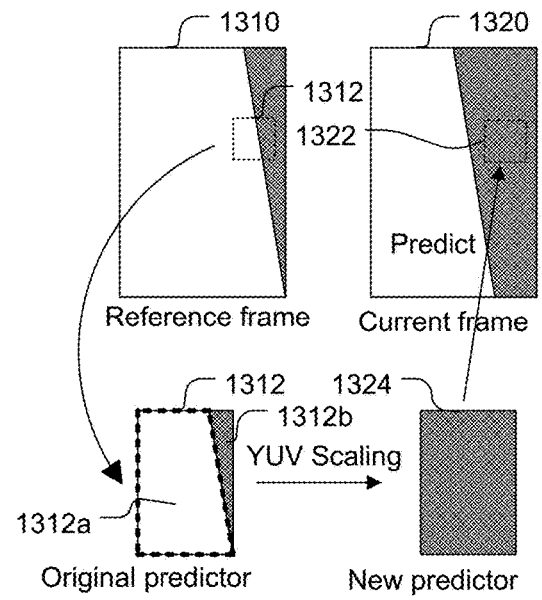
FIG. 13 illustrates an example of YUV scaling according to an embodiment of the present invention, where a seam exists in the reference block and there is no seam in the corresponding current block.

The scaling can be implemented as a linear function: $I'=a*I+b$, where I corresponds to the original pixel intensity, $I'$ corresponds to the scaled pixel intensity, and a and b are scaling parameters. Parameter a may be referred as a multiplication factor and parameter b may be referred as an offset factor. FIG. 13 illustrates an example of YUV scaling according to an embodiment of the present invention. In FIG. 13, reference frame 1310 is used to derive a seam-based Inter predictor for current frame 1320. For example, current block 1322 is predicted by a corresponding block 1312. However, a seam exists in the reference block and there is no seam in the current block. The YUV pixels of the reference block on one side of the seam are scaled to provide a scaled predictor 1324 for the current block according to the following equations:

$$Y'=Y*0.25+5 \text{ (e.g. } 50=180*0.25+5) \tag{4}$$

$$U'=U*1+0 \text{ (e.g. } 0=0*1+0) \tag{5}$$

$$V'=V*1+0 \text{ (e.g. } 0=0*1+0) \tag{6}$$

In FIG. 13, the seam in the original predictor 1312 splits the block into two regions (i.e., 1312a and 1312b). The apparent brightness/color discrepancy across the seam in the pre-stitched frame may be caused by the differences in the illumination of two images corresponding to two views being stitched or background changing between two stitched images for the same continuous foreground. Therefore, pixel intensities on one side of the seam can be adjusted to generate a better Inter predictor according to one embodiment of the present invention. In this example, the pixels in region 1312a are scaled according to equations (4)-(6). On the other hand, the pixels in region 1312b will be used directly without scaling. Accordingly, a new predictor 1324 is generated and the new predictor is used to predict the current block 1322.

Figure 14:
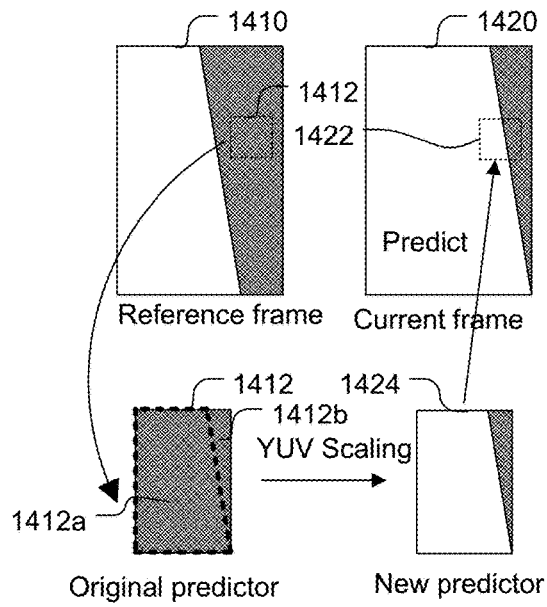
FIG. 14 illustrates an example of YUV scaling according to an embodiment of the present invention, where a seam exists in the current block and there is no seam in the corresponding reference block.

FIG. 14 illustrates another example of YUV scaling according to the present invention. In FIG. 14, reference frame 1410 is used to derive seam-based Inter predictor for current frame 1420. For example, current block 1422 is predicted by a corresponding block 1412. However, a seam exists in the current block and there is no seam in the reference block. The YUV pixels of the reference block on one side of the corresponding seam are scaled to provide a scaled predictor 1424 for the current block according to the following equations:

$$Y'=Y*3+30 \text{ (e.g. } 180=5*3+30) \tag{7}$$

$$U'=U*1+0 \text{ (e.g. } 0=0*1+0) \tag{8}$$

$$V'=V*1+0 \text{ (e.g. } 0=0*1+0) \tag{9}$$

In FIG. 14, the corresponding seam location in the original predictor 1312 is determined. The seam splits the block into two regions (i.e., 1412a and 1412b). While the original predictor appears to have continuous brightness/color, the current block has a noticeable seam. Therefore, pixel intensities of the original predictor on one side of the seam can be adjusted to generate a better Inter predictor. In this example, the pixels in region 1412*a* are scaled according to equations (7)-(9). On the other hand, the pixels in region 1412*b* will be used directly without scaling. Accordingly, a new predictor 1424 is generated and the new predictor is used to predict the current block 1422.

Figure 15:
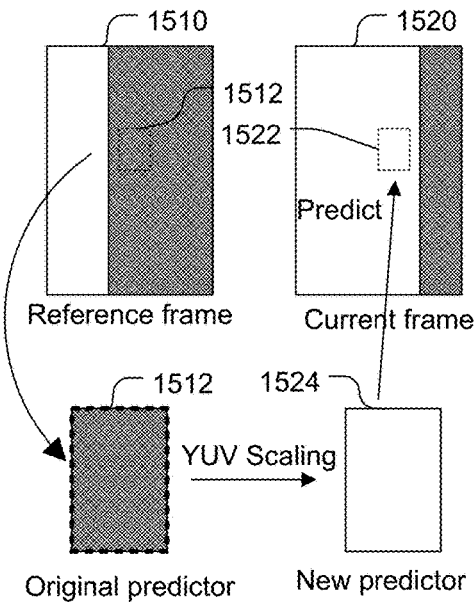
FIG. 15 illustrates an example of YUV scaling according to an embodiment of the present invention, where there is no seam in the current block and the corresponding reference block. However, the current block and the reference block are on different sides of a seam.

FIG. 15 illustrates an example of YUV scaling according the present invention. In FIG. 15, reference frame 1510 is used to derive seam-based Inter predictor for current frame 1520. For example, current block 1522 is predicted by a corresponding block 1512. While there is no seam in either the current block or the reference block, the brightness/color of the these two blocks looks very different since they are on different sides of a seam. The YUV pixels of the reference block are scaled to provide a scaled predictor 1524 for the current block according to the following equations:

$$Y'=Y*3+30 \text{(e.g. } 180=50*3+30) \quad (10)$$

$$U'=U*1+0 \text{(e.g. } 0=0*1+0) \quad (11)$$

$$V'=V*1+0 \text{(e.g. } 0=0*1+0) \quad (12)$$

Figure 16A:
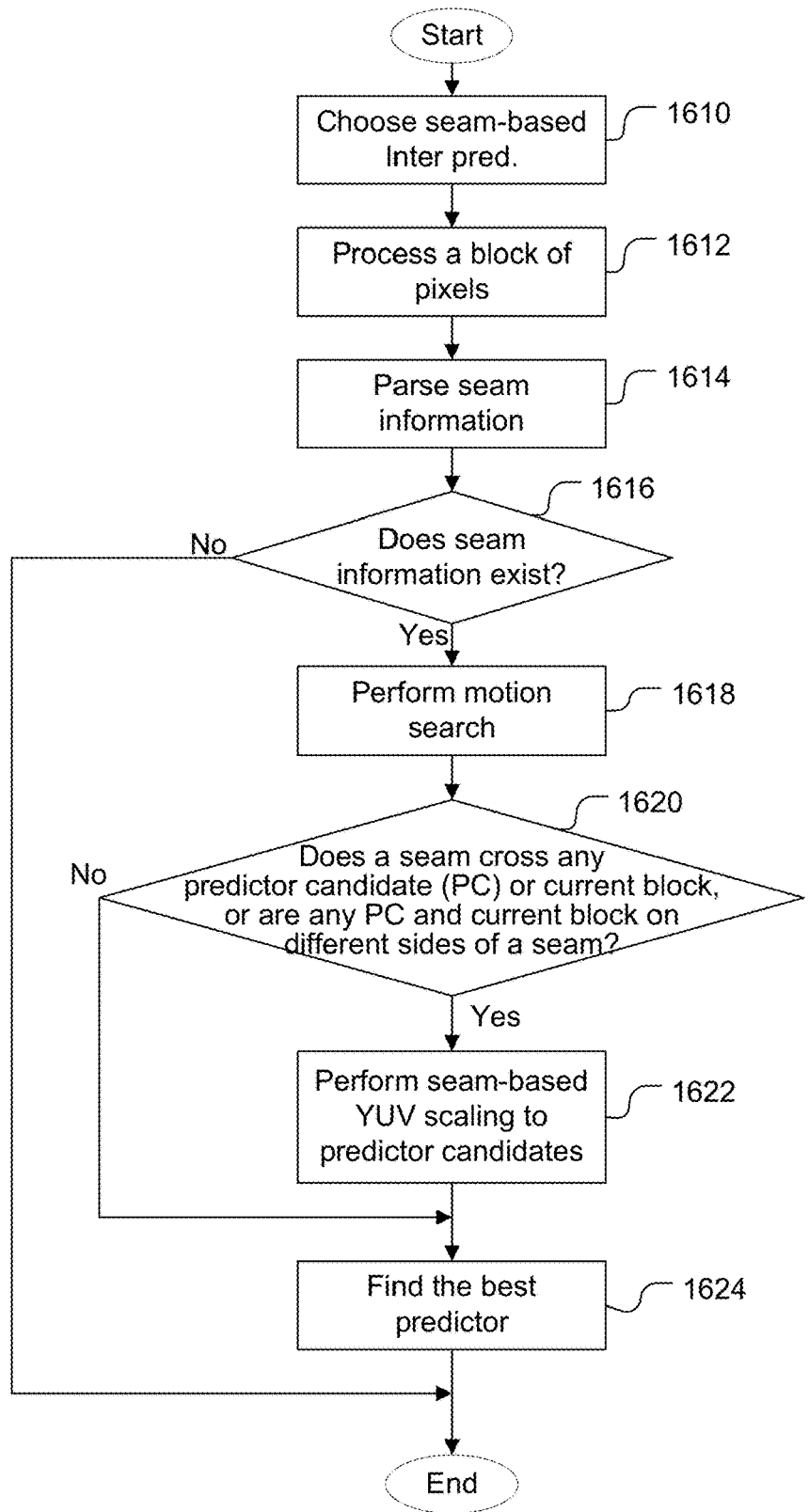
FIG. 16A illustrates an exemplary flowchart of the seam-based Inter prediction in the encoder side, where the seam-based Inter prediction is separated from the conventional Inter prediction.

In the example of FIG. 15, the scaling is applied to the whole reference block since the whole reference block is on an opposite side of the seam from the current block FIG. 16A illustrates an exemplary flowchart of the seam-based Inter prediction in the encoder side, where the seam-based Inter prediction is selected in step 1610. A current block of pixels is selected for processing in step 1612. Seam information is parsed from the input data in step 1614. Whether the input data include seam information is checked in step 1616. If seam information exists (i.e., the "Yes" path from 1616), the seam-based scaling process is started in stepm 1618, where motion search is performed to find reference blocks as predictor candidates that matches the current block. If no seam information exists (i.e., the "No" path from 1616), the process goes to End, which implies that no YUV scaling is performed. In this case, other coding mode, such as conventional Inter prediction or Intra prediction may be applied. Whether a seam crosses any predictor candidate or current block and whether any predictor candidate and current block are on different sides of a seam are checked in step 1620. If a seam crosses a predictor candidate (e.g., FIG. 13), a seam cross the current block (e.g. FIG. 14), or a predictor candidate and the current block are on different sides of a seam (e.g. FIG. 15), seam-based YUV scaling is performed on the predictor candidate as shown in step 1622. Otherwise (i.e. the "No" path from step 1620 corresponding to the case of no seam crossing any predictor candidate or the current block, and predictor candidates always being on a same side of the seam as the current block), no seam-based YUV scaling is needed and step 1622 is skipped in this case. After the seam-based YUV scaling is performed on the predictor candidate in step 1622, the residuals associated with each predictor candidate and associated coding bits are evaluated or estimated. The system selects a best predictor in step 1624. The selection of the best predictor candidate can be based on the Rate-Distortion optimization (RDO) process, which is well known in the field and the details are omitted in this disclosure.

While only the flowchart of the seam-based Inter prediction mode is shown in FIG. 16A for the encoder, the encoder may include other prediction modes such as the conventional Inter prediction and Intra prediction. If the encoder selects another mode, a respective encoding process for other coding modes will be performed. In FIG. 16A, it is assumed that the seam-based Inter prediction mode is implemented as an encoding mode module separated from the encoding mode module for the conventional Inter prediction mode.

Figure 16B:
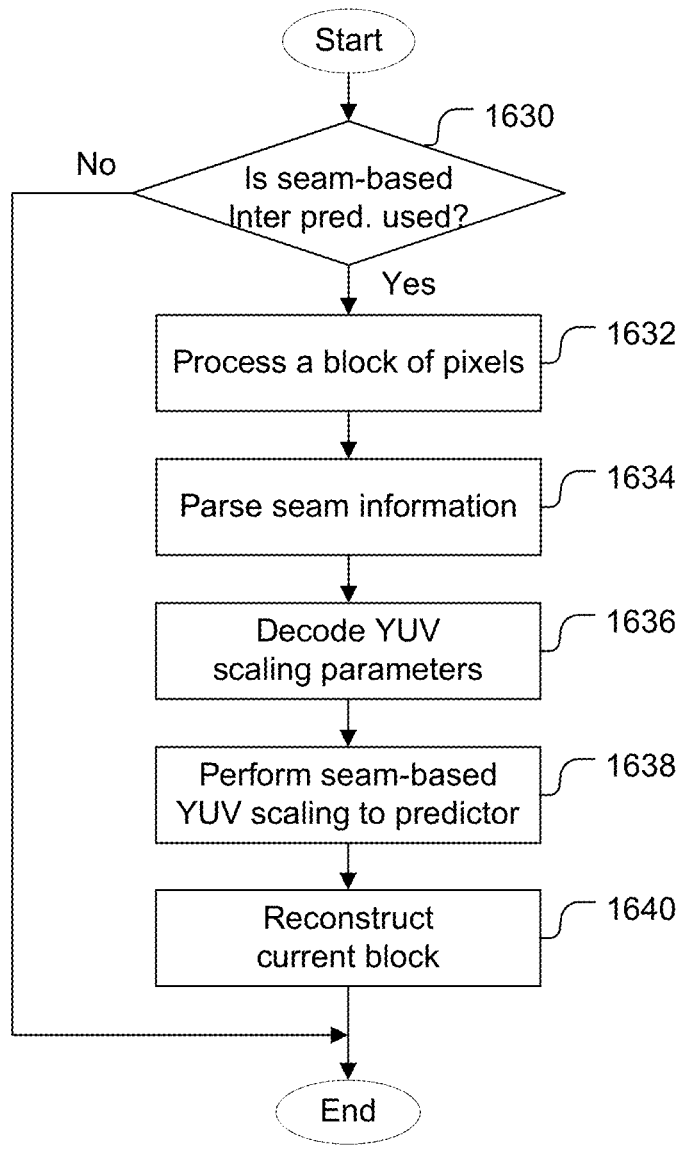
FIG. 16B illustrates an exemplary flowchart of the seam-based Inter prediction in the decoder side, where the seam-based Inter prediction is separated from the conventional Inter prediction.

FIG. 16B illustrates an exemplary flowchart of the seam-based Inter prediction in the decoder side. The decoder determines whether the current block being processed is coded in the seam-based Inter prediction mode in step 1630. If the current block is coded using the seam-based Inter prediction (i.e., the "Yes" path from step 163), the YUV scaling process is started in in step 1632 by processing a current block of pixels. Otherwise (i.e., the "No" path from step 1630), seam-based Inter prediction decoding process is terminated, which implied that other decoding mode is used. The current block of pixels is processed in step 1632. As is known in the field of video coding, the coded bits for the current block are parsed. The seam information for the current block are decoded in step 1634, where entropy decoding may be used if any syntax or symbol is entropy coded at the encoder side. Furthermore, YUV scaling parameters are decoded from the bitstream in step 1636. The predictor for the current block is then scaled according to the decoded YUV scaling parameters to generate a scaled predictor in step 1638. The scaled predictor is then combined with decoded residuals to reconstruct the current block in step 1640.

Similarly, while only the flowchart of the seam-based Inter prediction mode is shown in FIG. 16B for the decoder, the decoder may include other prediction modes such as the conventional Inter prediction and Intra prediction. If the mode decoded from the bitstream indicates other modes, a respective decoding process for another coding mode will be performed. In FIG. 16B, it is assumed that the seam-based Inter prediction mode is implemented as a decoding mode module separated from the decoding mode module for the conventional Inter prediction mode.

Figure 17A:
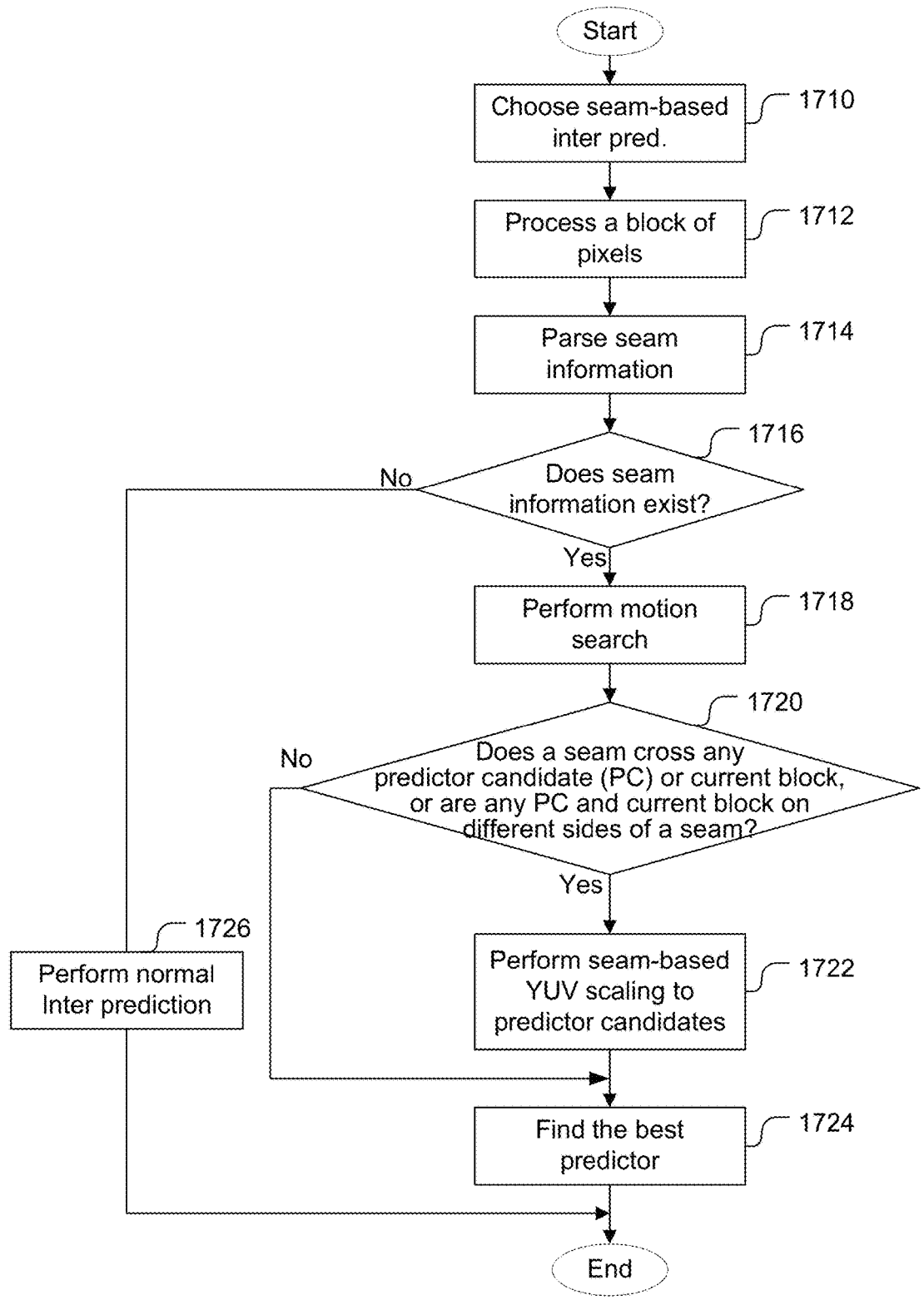
FIG. 17A illustrates an exemplary flowchart of the seam-based Inter prediction in the encoder side, where the seam-based Inter prediction is combined with the conventional Inter prediction.
Figure 17B:
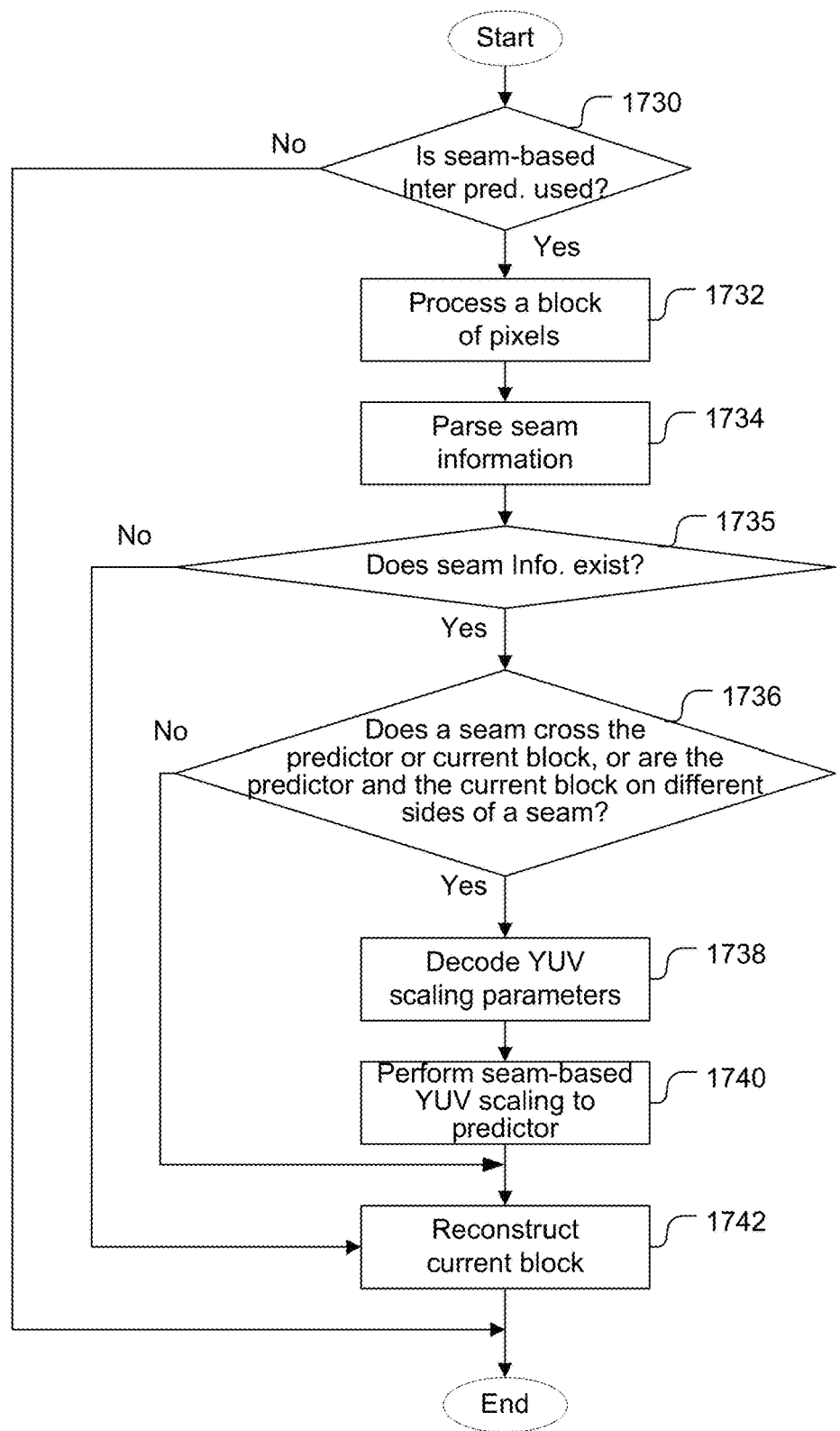
FIG. 17B illustrates an exemplary flowchart of the seam-based Inter prediction in the decoder side, where the seam-based Inter prediction is combined with the conventional Inter prediction.

FIG. 17A illustrates an exemplary flowchart of the joint seam-based Inter prediction in the encoder side, where the joint seam-based Inter prediction with an Inter prediction mode is selected in step 1710. A current block of pixels is selected for processing in step 1712. In step 1714, seam information is parsed from the input data. Whether the input data include seam information is checked in step 1716. If there is no seam information (i.e., the "No" path from step 1716), the normal Inter prediction is performed (i.e., step 1726). Otherwise (i.e., the "Yes" path from step 1716), the seam-based Inter prediction starts in step 1718, where motion search is performed to find reference blocks as predictor candidates that match the current block. Whether a seam crosses any predictor candidate or the current block and whether any predictor candidate and current block are on different sides of a seam are checked in step 1720. If a seam crosses a predictor candidate (e.g., FIG. 13), a seam cross the current block (e.g. FIG. 14), or a predictor candidate and the current block are on different sides of a seam (e.g. FIG. 15), seam-based YUV scaling is performed on the predictor candidate as shown in step 1722. Otherwise (i.e. the "No" path from step 1720 corresponding to the case of no seam crossing any predictor candidate or the current block, and predictor candidates being on a same side of the seam as the current block), no seam-based YUV scaling is needed and step 1722 is skipped. After the seam-based YUV scaling is performed on the predictor candidate in step 1722, the residuals associated with each predictor candidate and associated coding bits are evaluated or estimated. The system selects a best predictor in step 1724. The selection of the best predictor candidate can be based on the Rate-Distortion optimization (RDO) process, which is well known in the field and the details are omitted in this disclosure FIG. 17B illustrates an exemplary flowchart of the seam-based Inter prediction in the decoder side. The decoder determines whether the current block being processed is coded in the seam-based Inter prediction mode in step 1730. If the current block is coded using the seam-based Inter prediction (i.e., the "Yes" path from step 1730), the decoding process goes to step 1732 for seam-based decoding process. Otherwise (i.e., the "No" path from step 1730), the decoding process goes to End to skip the seam-based Inter prediction decoding, which implies that other coding mode is used. The current block of pixels is processed in step 1732. As is known in the field of video coding, the coded bits for the current block are parsed. The seam information for the current block are decoded in step 1734, where entropy decoding may be used if any syntax or symbol is entropy coded at the encoder side. Whether the seam information exists is checked in step 1735. If the seam information exists (i.e., the "Yes" path in step 1735), step 1736 is performed. Otherwise (i.e., the "No" path from step 1735), the reconstruction based on the conventional Inter prediction is performed in step 1742. Whether a seam crosses any predictor candidate or current block and whether any predictor candidate and current block are on different sides of a seam are checked in step 1736. If a seam crosses a predictor candidate (e.g., FIG. 13), a seam cross the current block (e.g. FIG. 14), or a predictor candidate and the current block are on different sides of a seam (e.g. FIG. 15), seam-based YUV scaling will be performed on the predictor candidate by decoding the YUV scaling parameters as shown in step 1738. Otherwise (i.e. the "No" path from step 1736 corresponding to the case of no seam going across any predictor candidate or the current block, and the predictor candidates being on a same side of the seam as the current block), no seam-based YUV scaling is needed and the normal Inter prediction will be performed (i.e., step 1742). For reconstructing in the conventional Inter prediction mode, the non-scaled predictor is added to the residuals derived from the bitstream to form the reconstructed block. After YUV scaling parameters are decoded from the bitstream in step 1738, the predictor for the current block is then scaled according to the decoded YUV scaling parameters to generate a scaled predictor in step 1740. The scaled predictor is then combined with decoded residuals to reconstruct the current block in step 1742.

Figure 18:
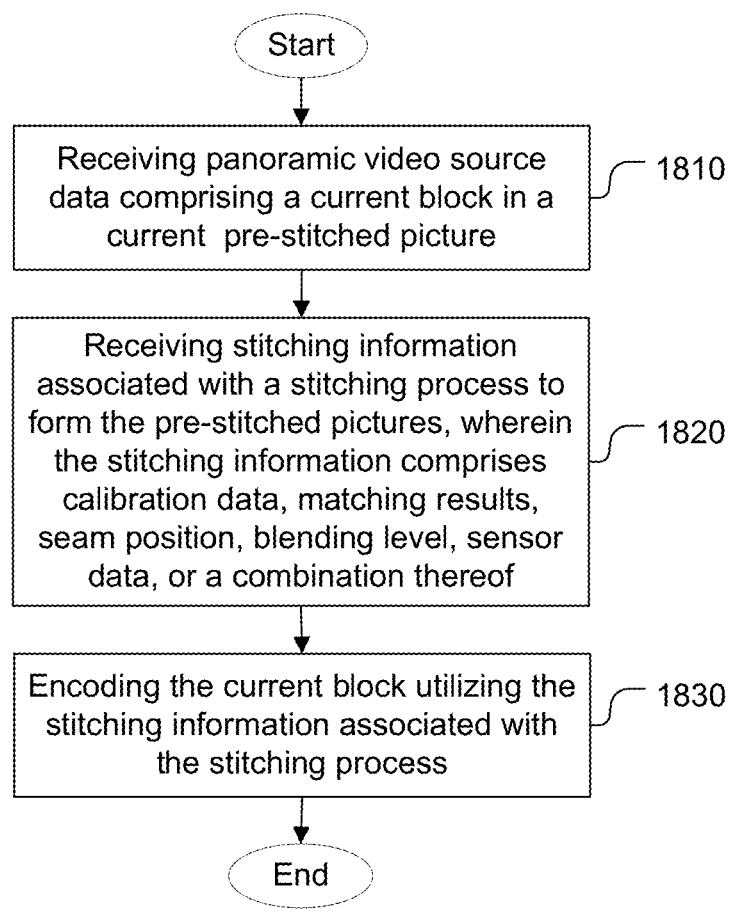
FIG. 18 illustrates an exemplary flowchart of video encoding of non-stitched pictures using a remapping IBC mode in a video encoder according to an embodiment of the present invention.

FIG. 18 illustrates an exemplary flowchart of video encoding of pre-stitched pictures according to an embodiment of the present invention. The steps shown in the flowchart, as well as other flowcharts in this disclosure, may be implemented as program codes executable on one or more processors (e.g., one or more CPUs) at the encoder side and/or the decoder side. The steps shown in the flowchart may also be implemented based on hardware such as one or more electronic devices or processors arranged to perform the steps in the flowchart. According to this method, the encoder receives panoramic video source data comprising a current block in a current pre-stitched picture in step 1810. The stitching information associated with a stitching process to form the pre-stitched pictures is received in step 1820, where the stitching information comprises calibration data, matching results, seam position, blending level, sensor data, or a combination thereof. The current block is encoded utilizing the stitching information associated with the stitching process in step 1830.

Figure 19:
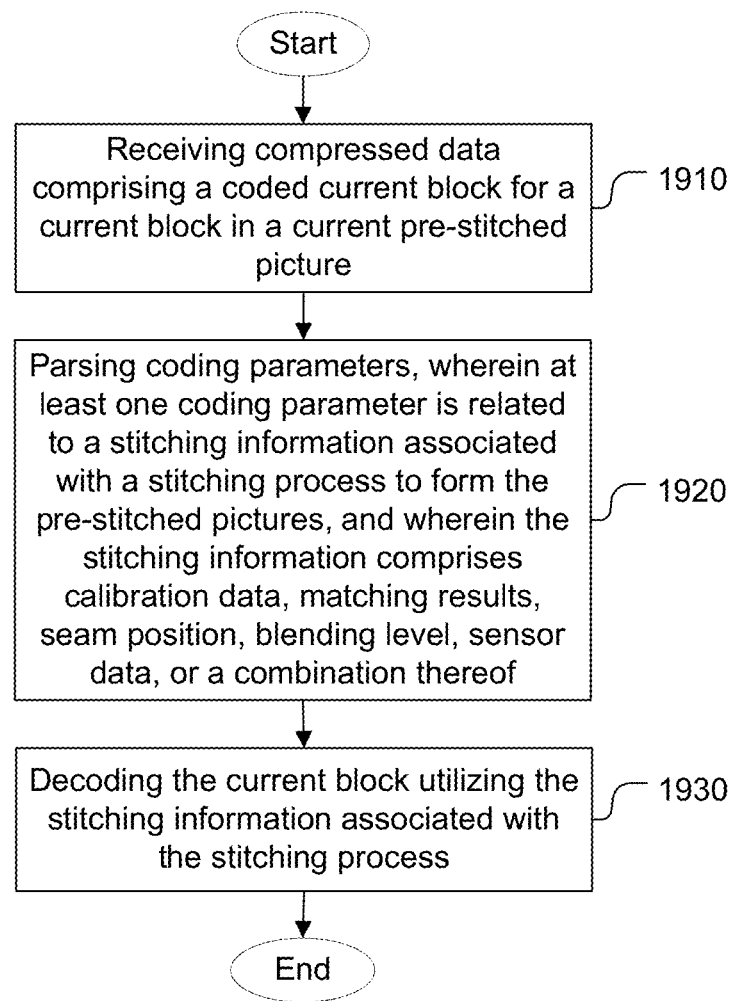
FIG. 19 illustrates an exemplary flowchart of video decoding of non-stitched pictures using a remapping IBC mode in a video decoder according to an embodiment of the present invention.

FIG. 19 illustrates an exemplary flowchart of video decoding of pre-stitched pictures in a video decoder according to an embodiment of the present invention. The decoder receives compressed data comprising a coded current block for a current block in a current pre-stitched picture in step 1910. Coding parameters are parsed from the compressed data, wherein at least one coding parameter is related to stitching information associated with a stitching process to form the pre-stitched pictures in step 1920, and where the stitching information comprises calibration data, matching results, seam position, blending level, sensor data, or a combination thereof. The current block is then decoded by utilizing the stitching information associated with the stitching process.

The flowcharts shown above are intended for serving as examples to illustrate embodiments of the present invention. A person skilled in the art may practice the present invention by modifying individual steps, splitting or combining steps with departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding of pre-stitched pictures for a video encoding system, wherein each pre-stitched picture is formed from at least two images captured by a plurality of cameras of a panoramic video capture device, and wherein two neighboring images captured by two neighboring cameras include at least an overlapped image area, the method comprising:

receiving panoramic video source data comprising a current block in a current pre-stitched picture;

receiving stitching information associated with a stitching process to form the pre-stitched pictures, wherein the stitching information comprises calibration data, matching results, seam position, blending level, sensor data, or a combination thereof, wherein the stitching information corresponds to seam information associated with seam detection, and seam-based Inter prediction is used to encode the current block by utilizing the seam information; and encoding the current block utilizing the stitching information associated with the stitching process.

2. The method of claim 1, wherein the stitching information corresponds to matching results associated with a projection process, and projection-based Inter prediction is used to encode the current block by projecting a reference block in a reference pre-stitched picture to coordinates of the current block.

3. The method of claim 2, wherein the projection-based Inter prediction performs motion search for the current block based on spherical coordinates designated as roll, pitch and yaw.

4. The method of claim 3, wherein a predictor candidate indicated by a spherical motion vector is projected to the coordinates of the current block using a translation matrix, wherein the spherical motion vector consists of roll, pitch and yaw values and the translation matrix is derived based on the roll, pitch and yaw values.

5. The method of claim 4, wherein residuals associated with each predictor candidate are derived from the current block and a projected predictor of each predictor candidate, rate-distortion cost associated with each predictor candidate is calculated, and a best predictor candidate is selected as a current predictor for the current block according to the rate-distortion cost.

6. The method of claim 2, wherein the projection-based Inter prediction is applied to the current block only if y-position of the current block is outside a specified range; and otherwise, normal Inter prediction is applied to the current block and motion search for best predictor is performed in (x, y) domain for the normal Inter prediction.

7. The method of claim 6, wherein the specified range corresponds to a middle range in vertical direction.

8. The method of claim 1, wherein the seam information is parsed from panoramic video source data and if the seam information exists, motion search is performed to identify predictor candidates; and whether a seam crosses any predictor candidate or the current block is checked and whether any predictor candidate and the current block are on different sides of a seam is checked.

9. The method of claim 8, wherein if the seam crosses any predictor candidate or the current block, brightness, color or both of the predictor candidate are adjusted to match the current block by scaling pixel intensities of the predictor candidate on one side of the seam and if any predictor candidate and the current block, brightness, color or both of the predictor candidate are adjusted to match the current block by scaling pixel intensities of all pixels in the predictor candidate.

10. The method of claim 8, wherein residuals associated with each predictor candidate are derived from the current block and a scaled predictor of each predictor candidate, rate-distortion cost associated with each predictor candidate is calculated, and a best predictor candidate is selected as a current predictor for the current block according to the rate-distortion cost.

11. The method of claim 1, wherein the seam information is parsed from panoramic video source data and if the seam information does not exist, conventional Inter prediction is applies to encode the current block.

12. An apparatus for video encoding of pre-stitched pictures for a video encoding system, wherein each pre-stitched picture is formed from at least two images captured by a plurality of cameras of a panoramic video capture device, and wherein two neighboring images captured by two neighboring cameras include at least an overlapped image area, the apparatus comprising one or more electronic circuits or processors arranged to:

receive panoramic video source data comprising a current block in a current pre-stitched picture;

receive stitching information associated with a stitching process to form the pre-stitched pictures, wherein the stitching information comprises calibration data, matching results, seam position, blending level, sensor data, or a combination thereof, wherein the stitching information corresponds to seam information associated with seam detection, and seam-based Inter prediction is used to encode the current block by utilizing the seam information; and encode the current block utilizing the stitching information associated with the stitching process.

13. A method of video decoding of pre-stitched pictures for a video decoding system, wherein each pre-stitched picture is formed from at least two images captured by a plurality of cameras of a panoramic video capture device, and wherein two neighboring images captured by two neighboring cameras include at least an overlapped image area, the method comprising:

receiving compressed data comprising a coded current block for a current block in a current pre-stitched picture;

parsing coding parameters, wherein at least one coding parameter is related to a stitching information associated with a stitching process to form the pre-stitched pictures, and wherein the stitching information comprises calibration data, matching results, seam position, blending level, sensor data, or a combination thereof, wherein the stitching information corresponds to seam information associated with seam detection, and seam-based Inter prediction is used to decode the current block by utilizing the seam information; and decoding the current block utilizing the stitching information associated with the stitching process.

14. The method of claim 13, wherein the stitching information corresponds to matching results associated with a projection process, and projection-based Inter prediction is used to decode the current block by projecting a reference block in a reference pre-stitched picture to coordinates of the current block.

15. The method of claim 14, wherein the projection-based Inter prediction performs motion compensation for the current block based on spherical coordinates designated as roll, pitch and yaw.

16. The method of claim 15, wherein a spherical motion vector is decoded from the compressed data and a predictor indicated by the spherical motion vector is projected to the coordinates of the current block to form a projected predictor using a translation matrix, and wherein the spherical motion vector consists of roll, pitch and yaw values and the translation matrix is derived based on the roll, pitch and yaw values.

17. The method of claim 16, wherein residuals of the current block are derived from the compressed data, and the current block is reconstructed from the residuals of the current block and the projected predictor.

18. The method of claim 14, wherein the projection-based Inter prediction is applied to decode the current block only if y-position of the current block is outside a specified range; and otherwise, normal Inter prediction is applied to decode the current block and a predictor indicated by a motion vector in (x, y) domain is combined with residuals derived from the compressed data to reconstruct the current block.

19. The method of claim 18, wherein the specified range corresponds to a middle range in vertical direction.

20. The method of claim 13, wherein the seam information is parsed from the compressed data, whether a seam crosses a current predictor for the current block or the current block is checked, and whether the current predictor and the current block are on different sides of a seam is checked.

21. The method of claim 20, wherein if the seam crosses a current predictor for the current block or the current block, then brightness, color or both of the current predictor are adjusted to match the current block by scaling pixel intensities of the current predictor on one side of the seam to form a scaled predictor and if the current predictor and the current block are on different sides of the seam, then brightness, color or both of the current predictor are adjusted to match the current block by scaling pixel intensities of all pixels in the current predictor to form the scaled predictor; and wherein the scaled predictor is combined with residuals decoded from the compressed data to reconstruct the current block.

22. The method of claim 20, wherein if the seam does not cross a current predictor for the current block or the current block, or both the current predictor and the current block are on a same side of the seam, the current predictor without scaling is combined with residuals decoded from the compressed data to reconstruct the current block.

23. The method of claim 13, wherein seam information is parsed from the compressed data and if the seam information does not exist, conventional Inter prediction is applies to decode the current block.

24. An apparatus for video decoding of pre-stitched pictures for a video decoding system, wherein each pre-stitched picture is formed from at least two images captured by a plurality of cameras of a panoramic video capture device, and wherein two neighboring images captured by two neighboring cameras include at least an overlapped image area, the apparatus comprising one or more electronic circuits or processors arranged to:

receive compressed data comprising a coded current block for a current block in a current pre-stitched picture;

parse coding parameters, wherein at least one coding parameter is related to a stitching information associated with a stitching process to form the pre-stitched pictures, and wherein the stitching information comprises calibration data, matching results, seam position, blending level, sensor data, or a combination thereof, wherein the stitching information corresponds to seam information associated with seam detection, and seam-based Inter prediction is used to decode the current block by utilizing the seam information; and decode the current block utilizing the stitching information associated with the stitching process.

\* \* \* \* \*